(12) United States Patent
Yanai et al.

(10) Patent No.: US 12,071,027 B2
(45) Date of Patent: Aug. 27, 2024

(54) TRAIN CONTROL SYSTEM, ON-BOARD DEVICE AND TRAIN CONTROL METHOD

(71) Applicant: MITSUBISHI HEAVY INDUSTRIES, LTD., Tokyo (JP)

(72) Inventors: Noritaka Yanai, Tokyo (JP); Tomonori Ishikawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 545 days.

(21) Appl. No.: 17/414,165

(22) PCT Filed: Feb. 6, 2020

(86) PCT No.: PCT/JP2020/004626
§ 371 (c)(1),
(2) Date: Jun. 15, 2021

(87) PCT Pub. No.: WO2020/170844
PCT Pub. Date: Aug. 27, 2020

(65) Prior Publication Data
US 2022/0080839 A1    Mar. 17, 2022

(30) Foreign Application Priority Data

Feb. 22, 2019  (JP) .................................. 2019-030668

(51) Int. Cl.
*B60L 15/40*  (2006.01)
*B61L 3/08*  (2006.01)

(52) U.S. Cl.
CPC .................. *B60L 15/40* (2013.01); *B61L 3/08* (2013.01)

(58) Field of Classification Search
CPC ...... B60L 15/40; B60L 15/32; B60L 2200/26; B61L 3/08; B61L 11/08; B61L 27/20; B61L 3/008; B61L 15/0072

(Continued)

(56) References Cited

U.S. PATENT DOCUMENTS

| 3,933,697 A | 1/1976 | Fujii et al. |
| 2010/0100267 A1 | 4/2010 | Morichika et al. |
| 2018/0346005 A1* | 12/2018 | Yanai ...................... B61L 27/12 |

FOREIGN PATENT DOCUMENTS

| CN | 106143539 | * 12/2017 |
| JP | S4840110 A | 6/1973 |

(Continued)

OTHER PUBLICATIONS

International Search Report and Written Opinion in corresponding International Application No. PCT/JP2020/004626, mailed Apr. 14, 2020; 12 pgs.

*Primary Examiner* — Muhammad Shafi
(74) *Attorney, Agent, or Firm* — HAUPTMAN HAM, LLP

(57) ABSTRACT

One embodiment of the present invention is a train control system which is a device executing an exclusive control between trains for each of a plurality of sections dividing up a track, wherein said train control system comprises: an on-ground device which manages whether each of the trains has a right to advance into each of the sections; and, an on-board device which is mounted on the trains, said trains comprising an on-board branch device, and with respect to one of the sections to which the on-ground device has given a certain train the right to advance, if said section is a branch section, which is a section that includes a branch, and when a branch direction of the train in said branch section and a branch direction of the on-board branch device coincide, said on-board device self-determines whether it is possible to advance into said branch section.

6 Claims, 22 Drawing Sheets

(58) Field of Classification Search
USPC .............................................................. 701/2
See application file for complete search history.

(56)          References Cited

FOREIGN PATENT DOCUMENTS

| JP | 50035293 A | 4/1975 |
| JP | 53096112 A | 8/1978 |
| JP | 59004727 A | 1/1984 |
| JP | 2009023509 A | 2/2009 |
| JP | 2010235003 A | 10/2010 |
| JP | 2017094975 A | 6/2017 |
| JP | 2017094975 | * 10/2019 |

* cited by examiner

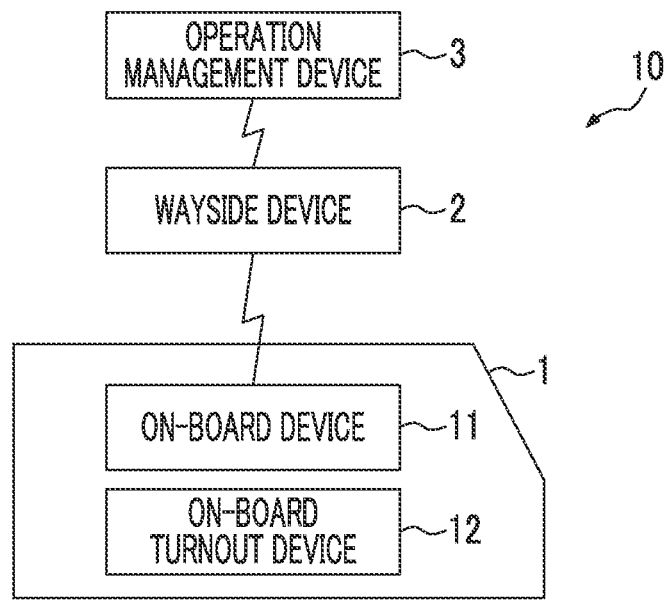
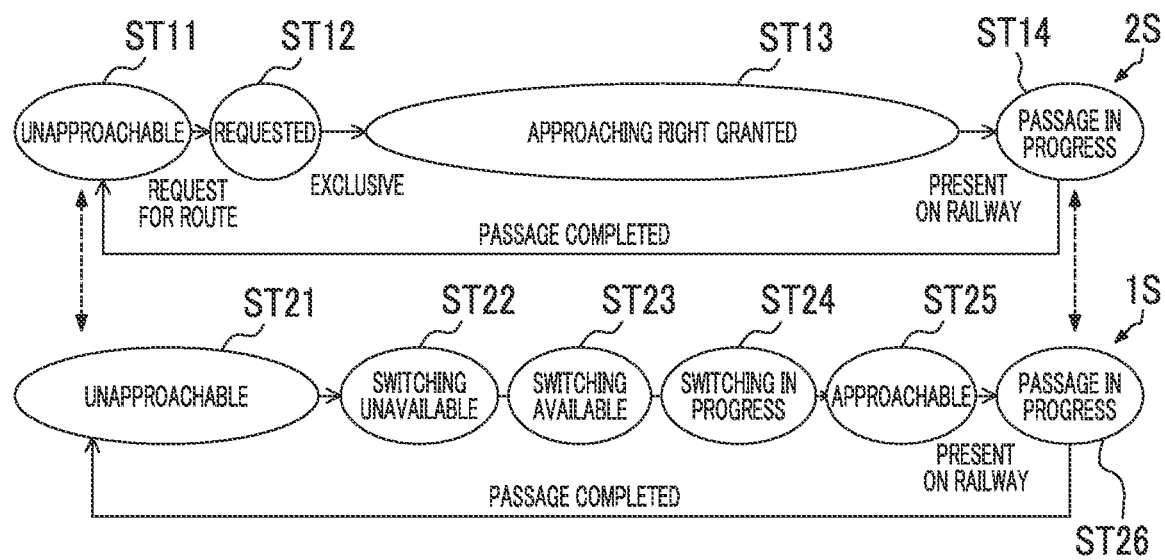

FIG. 3

| COMMUNICATION DIRECTION | COMMUNICATION CONTENT |
|---|---|
| WAYSIDE DEVICE → ON-BOARD DEVIC | PERMUTATION OF SECTIONS HAVING APPROACHING RIGHT |
| ON-BOARD DEVICE → WAYSIDE DEVICE | CURRENT POSITION |

FIG. 4

EXAMPLE OF RIGHT SECTION TABLE 111

| SECTION NAME | TURNOUT | PRESENT ON RAILWAY | APPROACHABLE |
|---|---|---|---|
| 2T | ABSENT | O | O |
| 3T | OPPOSITE POSITION | - | O |
| 4T | ABSENT | - | O |
| 5T | ABSENT | - | O |
| 6T | ABSENT | - | x |

TRAVELING DIRECTION ↓

O PRESENT ON RAILWAY
- ABSENT ON RAILWAY

O APPROACHABLE
x UNAPPROACHABLE

FIG. 9A
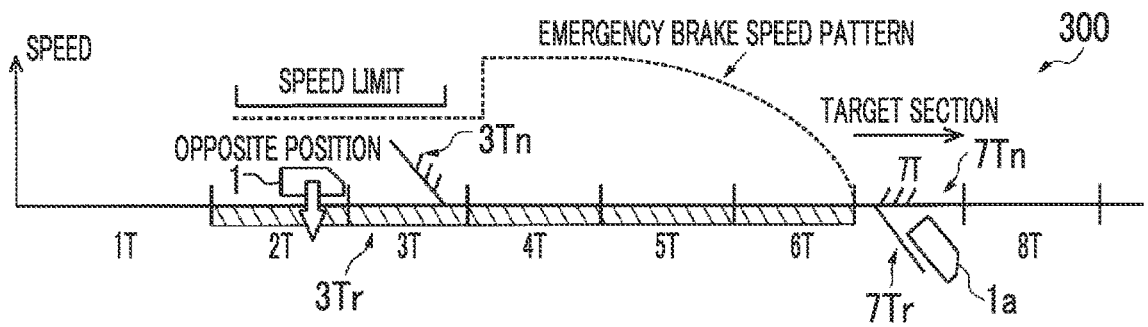
FIG. 9B
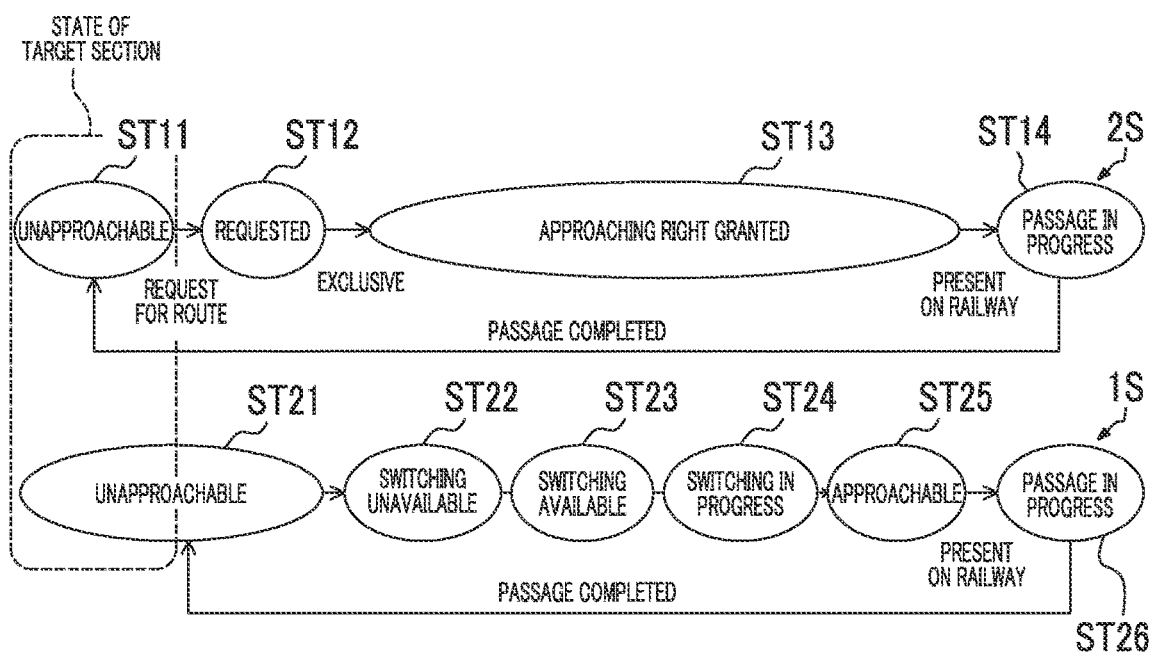
FIG. 9C
| SECTION NAME | TURNOUT | PRESENT ON RAILWAY | APPROACHABLE |
|---|---|---|---|
| 2T | ABSENT | O | O |
| 3T | OPPOSITE POSITION | - | O |
| 4T | ABSENT | - | O |
| 5T | ABSENT | - | O |
| 6T | ABSENT | - | O |

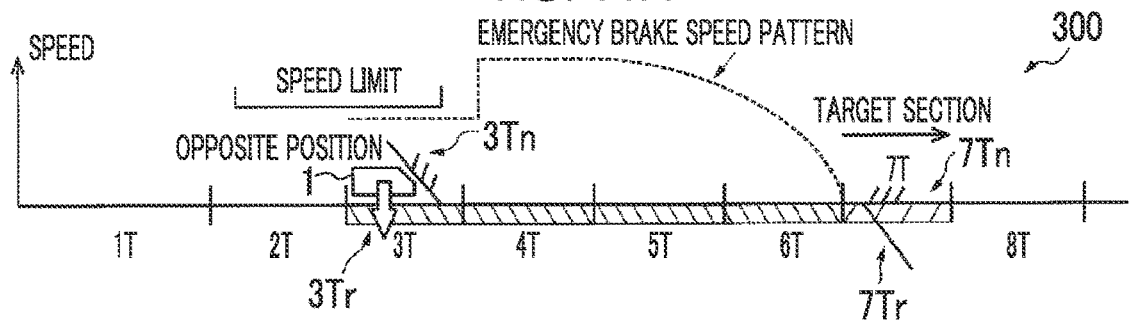
FIG. 11A
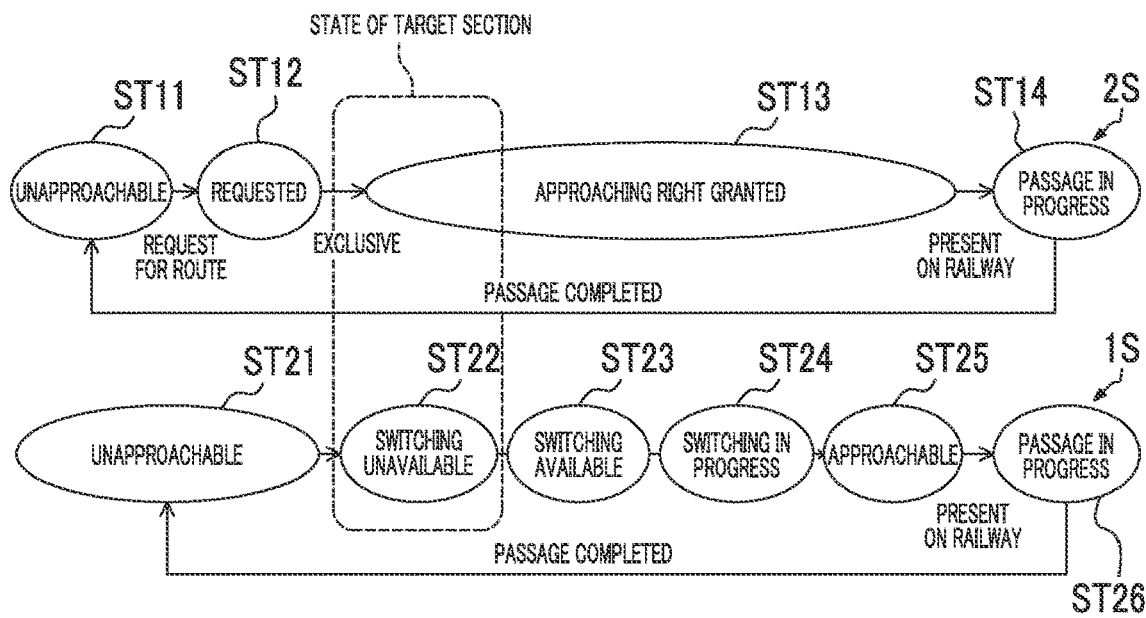
FIG. 11B
FIG. 11C
| SECTION NAME | TURNOUT | PRESENT ON RAILWAY | APPROACHABLE |
|---|---|---|---|
| 2T | ABSENT | O | O |
| 3T | OPPOSITE POSITION | O | O |
| 4T | ABSENT | - | O |
| 5T | ABSENT | - | O |
| 6T | ABSENT | - | O |
| 7T | NORMAL POSITION | - | × |

FIG. 12A
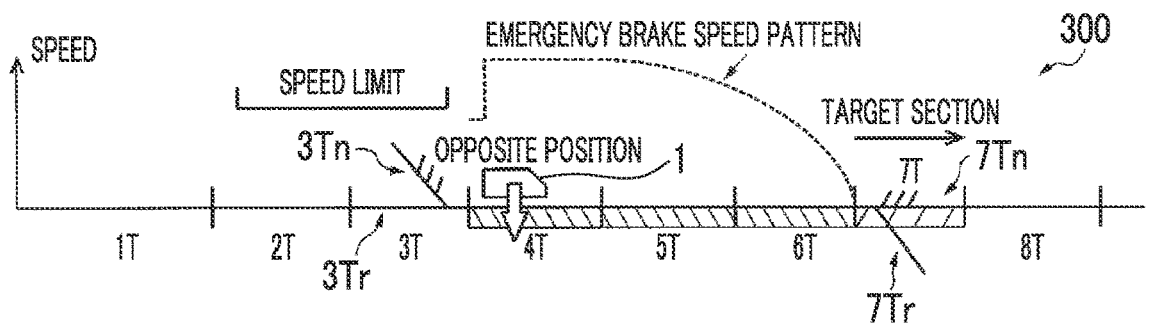
FIG. 12B
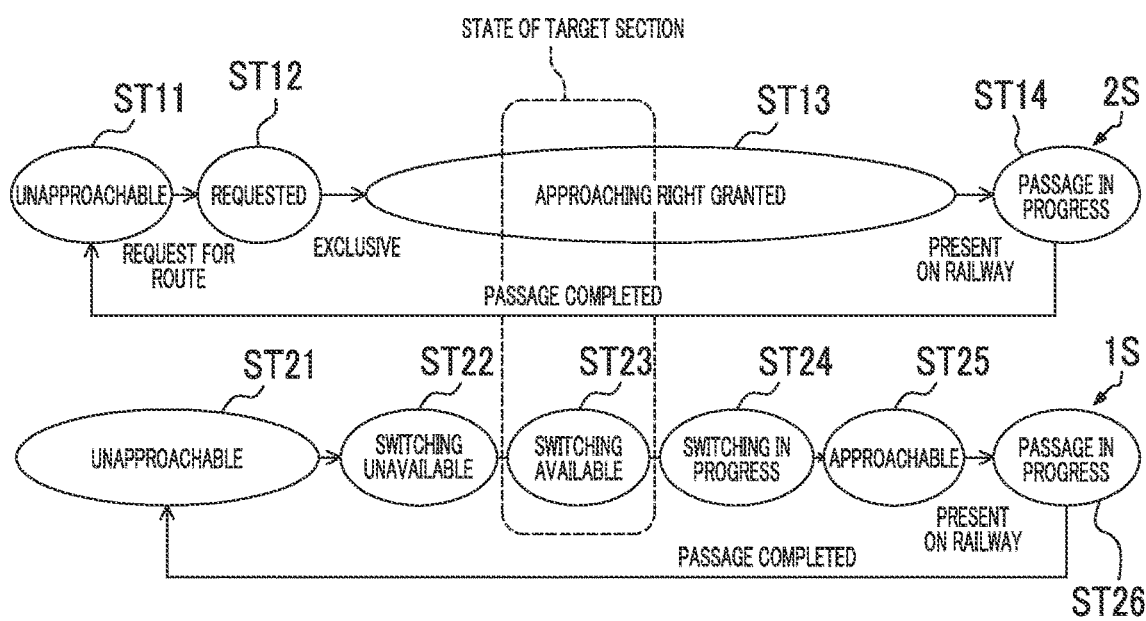
FIG. 12C
| SECTION NAME | TURNOUT | PRESENT ON RAILWAY | APPROACHABLE |
|---|---|---|---|
| 3T | OPPOSITE POSITION | ○ | ○ |
| 4T | ABSENT | ○ | ○ |
| 5T | ABSENT | - | ○ |
| 6T | ABSENT | - | ○ |
| 7T | NORMAL POSITION | - | × |

FIG. 13A
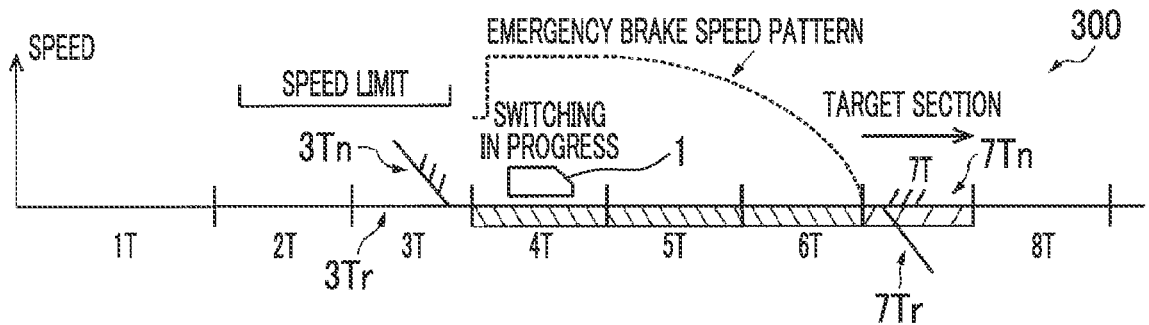
FIG. 13B
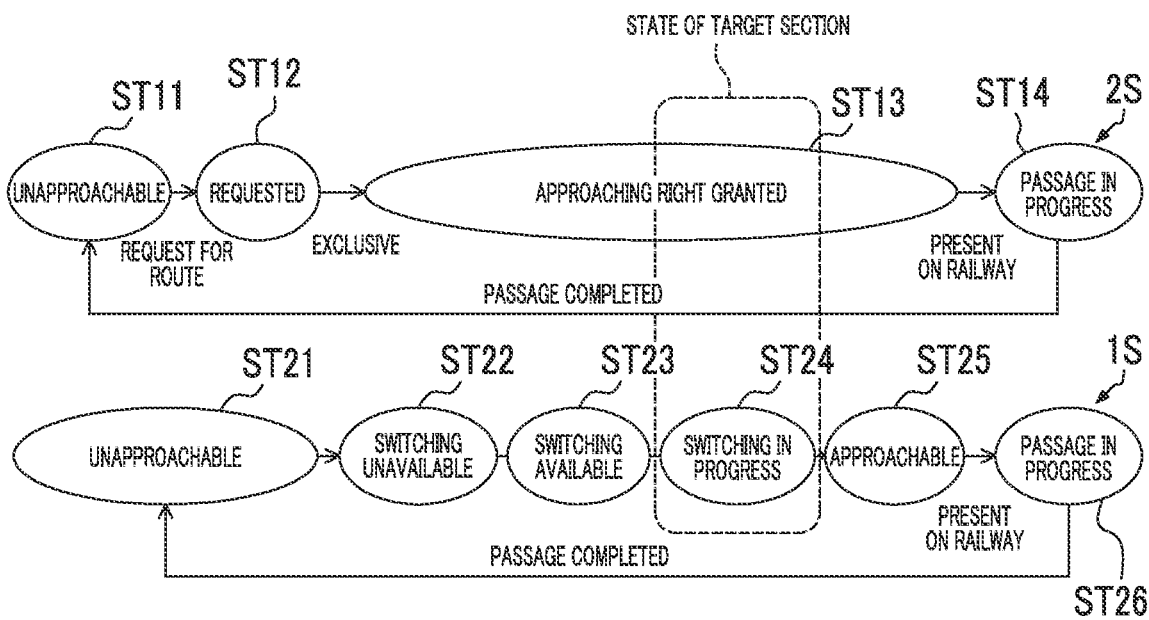
FIG. 13C
| SECTION NAME | TURNOUT | PRESENT ON RAILWAY | APPROACHABLE |
|---|---|---|---|
| 4T | ABSENT | O | O |
| 5T | ABSENT | - | O |
| 6T | ABSENT | - | O |
| 7T | NORMAL POSITION | - | X |

FIG. 14A
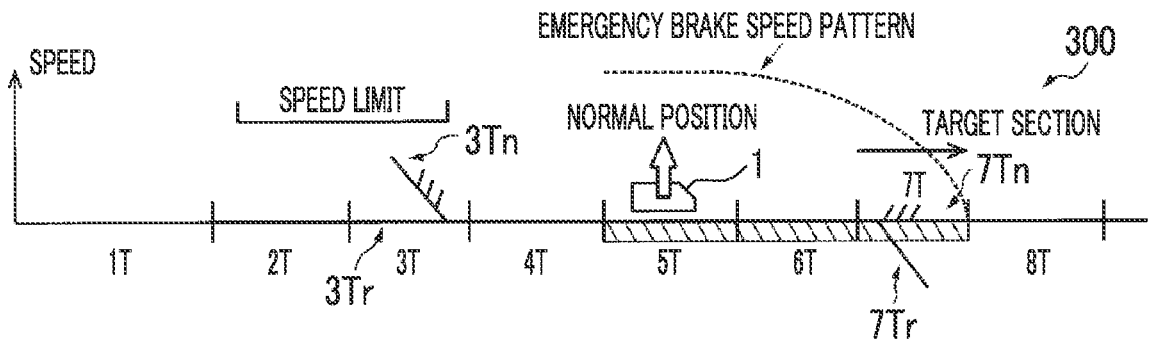
FIG. 14B
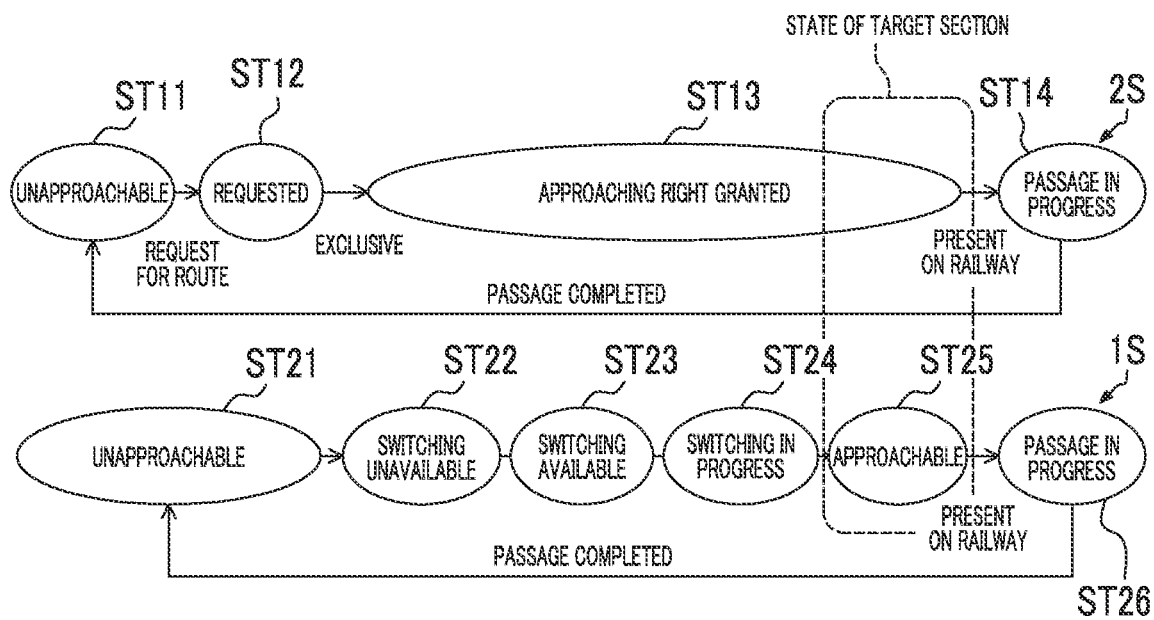
FIG. 14C

| COMMUNICATION DIRECTION | COMMUNICATION CONTENT |
|---|---|
| WAYSIDE DEVICE → ON-BOARD DEVICE | PERMUTATION OF SECTIONS HAVING APPROACHING RIGHT REQUEST STATE OF SUBSEQUENT SECTION |
| ON-BOARD DEVICE → WAYSIDE DEVICE | CURRENT POSITION |

FIG. 18

EXAMPLE OF RIGHT SECTION TABLE — 111b

| SECTION NAME | TURNOUT | PRESENT ON RAILWAY | APPROACHABLE |
|---|---|---|---|
| 2T | ABSENT | O | O |
| 3T | OPPOSITE POSITION | - | O |
| 4T | ABSENT | - | O |
| 5T | ABSENT | - | O |
| 6T | ABSENT | - | x |
| 7T | NORMAL POSITION | - | REQUESTED |

TRAVELING DIRECTION ↓

O PRESENT ON RAILWAY
- ABSENT ON RAILWAY

O APPROACHABLE
x UNAPPROACHABLE
REQUESTED  REQUESTED

TRAIN CONTROL SYSTEM, ON-BOARD DEVICE AND TRAIN CONTROL METHOD

RELATED APPLICATIONS

The present application is a National Phase of International Application Number PCT/JP2020/004626 filed Feb. 6, 2020 and claims priority to Japanese Application Number 2019-030668 filed Feb. 22, 2019.

TECHNICAL FIELD

The present disclosure relates to a train control system, an on-board device, and a train control method.

This application claims the priority of Japanese Patent Application No. 2019-030668 filed in Japan on Feb. 22, 2019, the content of which is incorporated herein by reference.

BACKGROUND ART

A rubber tire type transportation system is characterized in that a construction cost is lower compared to a general train railway system. However, it is necessary to install a switch point derail in a turnout point, and consequently, it is necessary to construct a signal line or a power line along a railroad. Therefore, when the switch point derail can be eliminated, further cost reduction can be expected.

As an idea for eliminating the switch point derail, an on-board turnout device is disclosed in Patent Document 1, Patent Document 2, and Patent Document 3. Patent Document 1 and Patent Document 2 disclose a mechanism for guiding one vehicle in a desired direction without using the switch point derail. However, both of these do not disclose a method of guaranteeing safety in a practical railway system in which a plurality of vehicles travel at a high speed. On the other hand, Patent Document 3 discloses the following system for securing the safety of the on-board turnout device.

In the system for securing the safety which is disclosed in Patent Document 3, signals including a speed command and a turnout direction command for each blocking section are transmitted from a wayside device to an on-board device. Each vehicle travels forward in accordance with the speed command, and on-board switching means is switched in accordance with the turnout direction command. Then, in each vehicle, when the turnout direction command and a turnout direction of on-board switching means do not coincide with each other in adjacent sections on facing sides of a turnout point of a track, each vehicle is stopped.

CITATION LIST

Patent Document

[Patent Document 1] Japanese Unexamined Patent Application Publication No. 53-96112
[Patent Document 2] Japanese Unexamined Patent Application Publication No. 50-35293
[Patent Document 3] Japanese Unexamined Patent Application Publication No. 59-4727

SUMMARY OF INVENTION

Technical Subject

In the system disclosed in Patent Document 3, the turnout direction command is transmitted to start switching in a block section, for example, two sections ahead of the turnout point of the track. When the turnout direction command and the turnout direction do not coincide with each other in the block section adjacent to the turnout point, the vehicle is stopped. In this case, the system disclosed in Patent Document 3 requires at least two block sections in order to secure safety of the on-board turnout device. Therefore, for example, when a plurality of the turnout points are close to each other, there is a disadvantage in that the safety is unlikely to be secured.

In view of the above-described circumstances, the present disclosure aims to provide a train control system, an on-board device, and a train control method which are capable of further improving safety.

Subject to be Solved

According to an aspect of the present disclosure, in order to solve the above-described subject, there is provided a train control system including a wayside device performing exclusive control between trains in each of a plurality of sections that divide a track, and managing whether or not each of the trains has an approaching right to each of the sections, and an on-board device mounted on the train including an on-board turnout device, and determining for itself that a turnout section is approachable, in a case where the section determined by the wayside device to which the train has the approaching right is the turnout section which is the section including a turnout, when a turnout direction of the train in the turnout section and a turnout direction of the on-board turnout device coincide with each other.

In addition, according to the aspect of the present disclosure, in the train control system, the wayside device may determine whether or not the train has the approaching right to the section when a request for the approaching right of the train to the section is received from a higher-level device. In a case where the wayside device receives the request with respect to a train, when the section relating to the request is the turnout section and the on-board turnout device is not locked, the on-board device may cause a turnout direction of the train and a turnout direction of the on-board turnout device in the turnout section to coincide with each other.

In addition, according to the aspect of the present disclosure, in the train control system, the wayside device may sequentially notify the on-board device of at least a permutation of the sections having the approaching right. The on-board device may sequentially notify the wayside device of at least a current position.

In addition, according to another aspect of the present disclosure, there is provided an on-board device mounted on trains including an on-board turnout device. For a section determined by a wayside device to which the train has the approaching right, the wayside device performing exclusive control between the trains in each of a plurality of sections that divide a track, and managing whether or not each of the trains has the approaching right to each of the sections, the on-board device determines for itself that a turnout section is approachable, in a case where the section is the turnout section which is the section including a turnout, when a turnout direction of the train in the turnout section and a turnout direction of the on-board turnout device coincide with each other.

In addition, according to still another aspect of the present disclosure, there is provided a train control method for a train control system including a wayside device performing exclusive control between trains in each of a plurality of sections that divide a track, and an on-board device mounted on the trains including an on-board turnout device. The train control method includes causing the wayside device to manage whether or not each of the trains has an approaching right to each of the sections, and causing the on-board device to determine for itself that a turnout section is approachable, in a case where the section determined by the wayside device to which the train has the approaching right is the turnout section which is the section including a turnout, when a turnout direction of the train in the turnout section and a turnout direction of the on-board turnout device coincide with each other.

Advantageous Effects of Invention

According to each aspect of the present disclosure, the wayside device manages whether or not each train has an approaching right to each section, and determines for itself whether or not the section including a turnout in which the on-board device has the approaching right is approachable. Therefore, safety can be further improved.

BRIEF DESCRIPTION OF DRAWINGS

FIG. 1 is a block diagram illustrating a basic configuration example of a train control system according to an embodiment of the present disclosure.

FIG. 2 is in a state transition diagram illustrating an operation example of a wayside device 2 and an on-board device 11 which are illustrated in FIG. 1.

FIG. 3 is a view for describing an example of communication between the wayside device 2 and the on-board device 11 which are illustrated in FIG. 1.

FIG. 4 is a schematic view illustrating an example of a right section table managed by the on-board device 11 illustrated in FIG. 1.

FIG. 9A is a schematic view for describing an operation example of a train control system 10 illustrated in FIG. 1.

FIG. 9B is a schematic view for describing an operation example of the train control system 10 illustrated in FIG. 1.

FIG. 9C is a schematic view for describing an operation example of the train control system 10 illustrated in FIG. 1.

FIG. 11A is a schematic view for describing an operation example of the train control system 10 illustrated in FIG. 1.

FIG. 11B is a schematic view for describing an operation example of the train control system 10 illustrated in FIG. 1.

FIG. 11C is a schematic view for describing an operation example of the train control system 10 illustrated in FIG. 1.

FIG. 12A is a schematic view for describing an operation example of the train control system 10 illustrated in FIG. 1.

FIG. 12B is a schematic view for describing an operation example of the train control system 10 illustrated in FIG. 1.

FIG. 12C is a schematic view for describing an operation example of the train control system 10 illustrated in FIG. 1.

FIG. 13A is a schematic view for describing an operation example of the train control system 10 illustrated in FIG. 1.

FIG. 13B is a schematic view for describing an operation example of the train control system 10 illustrated in FIG. 1.

FIG. 13C is a schematic view for describing an operation example of the train control system 10 illustrated in FIG. 1.

FIG. 14A is a schematic view for describing an operation example of the train control system 10 illustrated in FIG. 1.

FIG. 14B is a schematic view for describing an operation example of the train control system 10 illustrated in FIG. 1.

FIG. 14C is a schematic view for describing an operation example of the train control system 10 illustrated in FIG. 1.

FIG. 18 is a schematic view illustrating an example of a right section table managed by the on-board device 11 illustrated in FIG. 1 according to another embodiment of the present disclosure.

DESCRIPTION OF EMBODIMENTS

Figure 5:
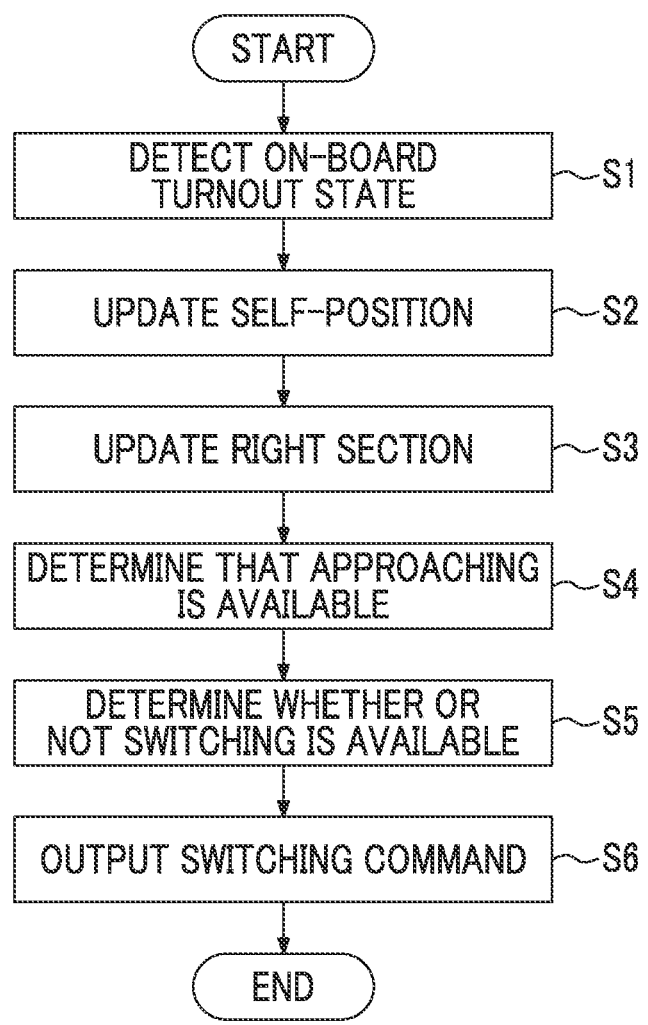
FIG. 5 is a flowchart illustrating an operation example of the on-board device 11 illustrated in FIG. 1.

Hereinafter, embodiments of the present disclosure will be described with reference to the drawings. In each drawing, the same reference numerals will be assigned to the same or corresponding configurations, and description thereof will be omitted as appropriate.

First Embodiment

FIG. 1 is a block diagram illustrating a basic configuration example of a train control system 10 according to a first embodiment of the present disclosure. The train control system 10 illustrated in FIG. 1 includes an on-board device 11 mounted on a train 1, a wayside device 2, and an operation management device 3. In the present embodiment, the train 1 is one vehicle for a track-based transportation system or a series of multiple vehicles for a track-based transportation system, and includes an on-board turnout device 12. For example, the train 1 represents one or more vehicles of a rubber tire transportation system. Although FIG. 1 illustrates only one train 1, the train control system 10 controls a plurality of the trains 1.

For example, the operation management device 3 is a component of a ground operation management system that manages an operation of the plurality of trains 1, and requests the wayside device 2 to secure a route for each of the trains 1. In the present embodiment, the operation management device 3 designates the train 1 and a section (block section) for the wayside device 2, and requests for the route. In the present embodiment, the request will be referred to as a route request or a request for an approaching right.

The wayside device 2 performs exclusive control between the trains 1 in each of a plurality of sections that divide a track on which the trains 1 travel. For example, the device configures a signal system, and manages whether or not each of the trains 1 has an approaching right to each of the sections. In the present embodiment, the exclusive control is performed to prevent two or more different trains 1 from accessing the same section at the same time. In the present embodiment, for example, having the approaching right to the section means that the section is approachable by the train 1, in a case where other conditions are satisfied, for example, when a turnout direction of the on-board turnout device 12 coincides with a turnout direction of a turnout point. In addition, a fact that there is no approaching right to the section means that the section is not approachable (unapproachable) by the train 1, for example, in a case where the train 1 other than the train 1 has the approaching right to the section. For example, the wayside device 2 determines whether or not the train 1 has the approaching right to the section in a case where a route request (request for the approaching right) of the train 1 for the section is received from the operation management device 3 which is a higher-level device. For example, the wayside device 2 sequentially notifies the on-board device 11 of a permutation (those in which the respective sections having the approaching right are aligned in order) of the sections having the approaching right. In addition, the wayside device 2 sequentially receives information indicating at least a current position of the train 1 from the on-board device 11. For example, communication between the wayside device 2 and the on-board device 11 can be exchanged via a track circuit or in a wireless manner.

The on-board device 11 is mounted on the train 1 including the on-board turnout device 12. The on-board device 11 determines for itself that a turnout section is approachable, in a case where the section determined by the wayside device 2 that the train 1 has the approaching right is the turnout section which is the section including a turnout, when the turnout direction of the train 1 in the turnout section and the turnout direction of the on-board turnout device 12 coincide with each other. In addition, the on-board device 11 causes the turnout direction of the train 1 in the turnout section and the turnout direction-of the on-board turnout device 12 to coincide with each other, when determining whether or not the train 1 has the approaching right to the section in a case where the wayside device 2 receives a request of the train 1 for the approaching right to the section from the operation management device 3, when the wayside device 2 receives the request of the train 1, and when the section relating to the request is the turnout section and the on-board turnout device 12 is not locked. That is, in a case where the wayside device 2 receives the request of the train 1, when the on-board turnout device 12 is not locked, the on-board device 11 controls the on-board turnout device 12 so that the turnout direction of the train 1 in the turnout section and the turnout direction of the on-board turnout device 12 coincide with each other. In addition, for example, the on-board device 11 recognizes a self-position by passage information and speed integration of a position marker installed on the track, and transmits the self-position to the wayside device 2. In addition, an emergency brake speed pattern is generated, based on a range of the section having the approaching right which is received from the wayside device 2, and in a case where a train speed exceeds the speed, brake control is performed. The emergency brake speed pattern is a speed pattern that enables the train 1 to safely stop before accessing the section which the on-board device 11 cannot access. The on-board device 11 sequentially receives information indicating the permutation of at least the section having the approaching right from the wayside device 2, and sequentially notifies the wayside device 2 of information indicating at least a current position.

Figure 22:
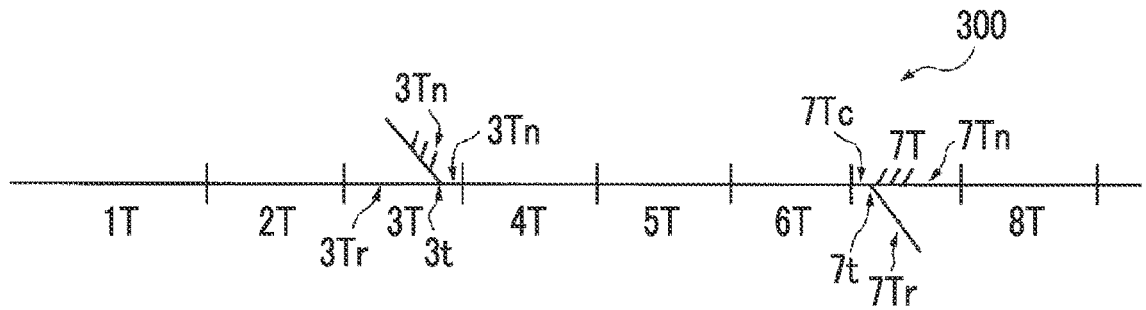
FIG. 22 is a schematic view for describing a train control system according to an embodiment of the present disclosure.
Figure 23:
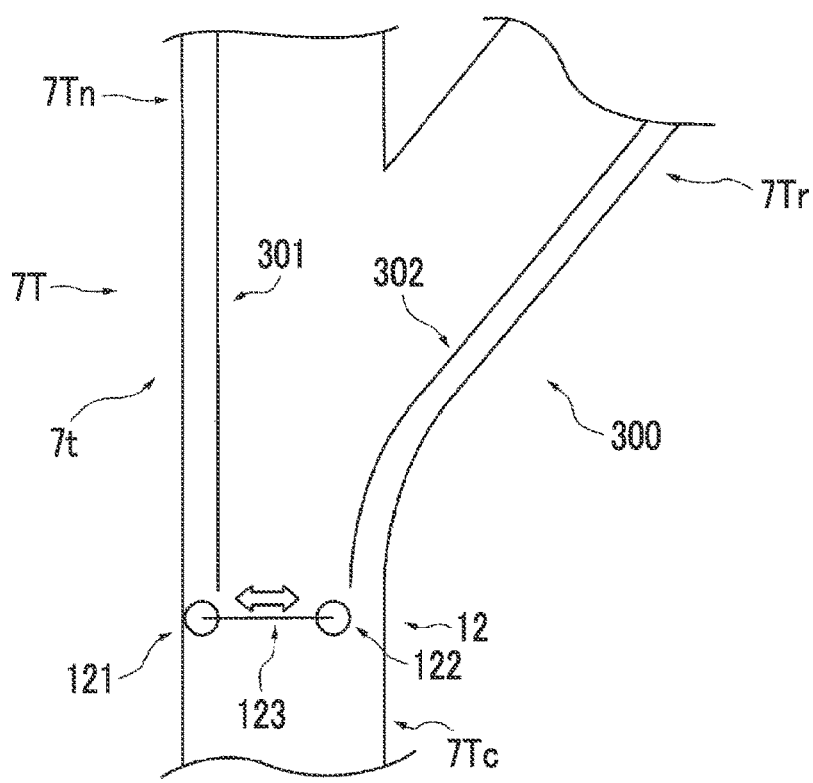
FIG. 23 is a schematic view for describing a train control system according to an embodiment of the present disclosure.

In addition, for example, the on-board turnout device 12 can adopt the on-board turnout device disclosed in Patent Documents 1 to 3. The on-board turnout device 12 changes a switching direction (turnout direction) in a normal position state or an opposite position state before reaching the turnout point on the track, in accordance with an instruction of the on-board device 11. FIG. 22 schematically illustrates an example of a track 300 used as an example of the present embodiment, and FIG. 23 schematically illustrates a configuration example of the on-board turnout device 12. The track 300 illustrated in FIG. 22 is configured so that a section name (section identification information) is divided into eight sections (also referred to as sections 1T to 8T) of 1T to 8T. In the track 300 illustrated in FIG. 22, the section 3T is a section having a turnout point 3t (turnout section), and the section 7T is a section having a turnout point 7t. In this case, the section 3T is divided into a common portion 3Tc of the section 3T, a normal position side 3Tn of the section 3T, and an opposite position side 3Tr of the section 3T, when the turnout point 3t serves as a turnout point. In addition, the section 7T is divided into a common portion 7Tc of the section 7T, a normal position side 7Tn of the section 7T, and an opposite position side 7Tr of the section 7T, when the turnout point 7*t* serves as a turnout point. In addition, as illustrated in FIG. 23, for example, the turnout point 7*t* of the section 7T has turnout guide walls 301 and 302. For example, the on-board turnout device 12 has guide wheels 121 and 122 supported by a support shaft 123, moves the support shaft 123 in a rightward-leftward direction indicated by a white arrow, and brings either the guide wheels 121 or 122 into contact with either the turnout guide walls 301 and 302, thereby changing the turnout direction. A state where the support shaft 123 is locked by being moved to the left side or the right side will be referred to as a state where the on-board turnout device 12 is locked.

Next, an operation example of the wayside device 2 and the on-board device 11 which are illustrated in FIG. 1 will be described with reference to FIGS. 2 to 15B. FIG. 2 illustrates a state transition diagram 2S of the wayside device 2 illustrated in FIG. 1 and a state transition diagram 1S of the on-board device 11. In the state transition diagram 2S of the wayside device 2 and the state transition diagram 1S of the on-board device 11, the respective states generally correspond to each other in an upward-downward direction indicated by a broken line arrow. The wayside device 2 manages each section for each train 1 in any one state of unapproachable (ST11), requested (ST12), approaching right granted (ST13), or passage in progress (ST14). The unapproachable (ST11) is in a state where the section is not approachable by the train 1. In a case where a route request of the train 1 for the section is received by the wayside device 2 from the operation management device 3, the wayside device 2 makes state transition from the unapproachable (ST11) to the requested (ST12). The requested (ST12) is in a state where the wayside device 2 receives the route request of the train 1 for the section from the operation management device 3 and determines (under determination) whether or not the train 1 has the approaching right. In a case where it is confirmed that an exclusive condition is satisfied, the wayside device 2 makes state transition from the requested (ST12) to the approaching right granted (ST13). The exclusive condition is a condition that the approaching right to the section is not granted to the train 1 other than the train 1. The approaching right granted (ST13) is in a state where the approaching right to the section is granted to the train 1. In a case where the train 1 is present on a railway in the section, the wayside device 2 makes state transition from the approaching right granted (ST13) to the passage in progress (ST14). The passage in progress (ST14) is in a state where the train 1 is traveling in the section. In a case where the train 1 completely passes through the section, the wayside device 2 makes state transition from the passage in progress (ST14) to the unapproachable (ST11).

On the other hand, the on-board device 11 manages each section for the train 1 in any one state of unapproachable (ST21), switching unavailable (ST22), switching available (ST23), switching in progress (ST24), approachable (ST25), or passage in progress (ST26). The unapproachable (ST21) is in a state where the section is not approachable by the train 1. In a case where the wayside device 2 determines that the train 1 has the approaching right to the section (ST13), the on-board device 11 makes state transition from the unapproachable (ST21) to the switching unavailable (ST22). The switching unavailable (ST22) is in a state where the on-board turnout device 12 of the train 1 cannot change the turnout direction. In a case where a condition of the switching available (ST23) is satisfied, the on-board device 11 makes state transition from the switching unavailable (ST22) to the switching available (ST23). For example, in a case where there is another turnout section in which passage is not started or is in progress behind the section, the section is in a state of the switching unavailable (ST22). The switching available (ST23) is in a state where the on-board turnout device 12 of the train 1 can change the turnout direction. In a case where the on-board turnout device 12 starts changing the turnout direction, the on-board device 11 makes state transition from the switching available (ST23) to the switching in progress (ST24). The switching in progress (ST24) is in a state where the on-board turnout device 12 of the train 1 currently changes the turnout direction. In a case where the on-board turnout device 12 completely changes the turnout direction, the on-board device 11 makes state transition from the switching in progress (ST24) to the approachable (ST25). The approachable (ST25) is in a state where the train 1 can access the section (approachable). In a case where the train 1 is present on the railway in the section, the on-board device 11 makes state transition from the approachable (ST25) to the passage in progress (ST26). The passage in progress (ST26) is in a state where the train 1 currently travels in the section. In a case where the train 1 completely passes through the section, the on-board device 11 makes state transition from the passage in progress (ST26) to the unapproachable (ST21).

FIG. 3 is a view for describing an example of an information communication direction and information content between the wayside device 2 and the on-board device 11 which are illustrated in FIG. 1. As illustrated in FIG. 3, the wayside device 2 transmits information indicating the permutation of the sections having the approaching right toward the on-board device 11, and the on-board device 12 transmits information indicating a current position of the train 1 to the wayside device 2.

FIG. 4 is a schematic view illustrating a configuration example of a right section table 111 managed by the on-board device 11 illustrated in FIG. 1. The right section table 111 illustrated in FIG. 4 is a file that stores all of the sections determined by the wayside device 2 that the train 1 has the approaching right to the sections, in the order corresponding to the traveling direction of the train 1, in association with section names, contents of the turnout, whether or not the train 1 is present on the railway, and whether the sections are approachable by the train 1. In the right section table 111 illustrated in FIG. 4, the upper section is a front side in the traveling direction, and the lower section is an opposite side in the traveling direction. The right section table 111 illustrated in FIG. 4 includes each information on the track 300 illustrated in FIG. 22 in a case where the train 1 is present on the railway in the section 2T in a state where the train 1 has the approaching right to each section up to the section 6T. For example, the section 2T is in a state where the turnout is absent, the train 1 is present on the railway "◯", and the approachable (ST25). In addition, for example, the section 3T is in a state where the turnout is the "opposite position", the train 1 is absent on the railway "-", and the approachable (ST25). The turnout is illustrated as "none". Alternatively, in some cases, the turnout direction is illustrated as the "normal position" or the "opposite position".

Figure 6:
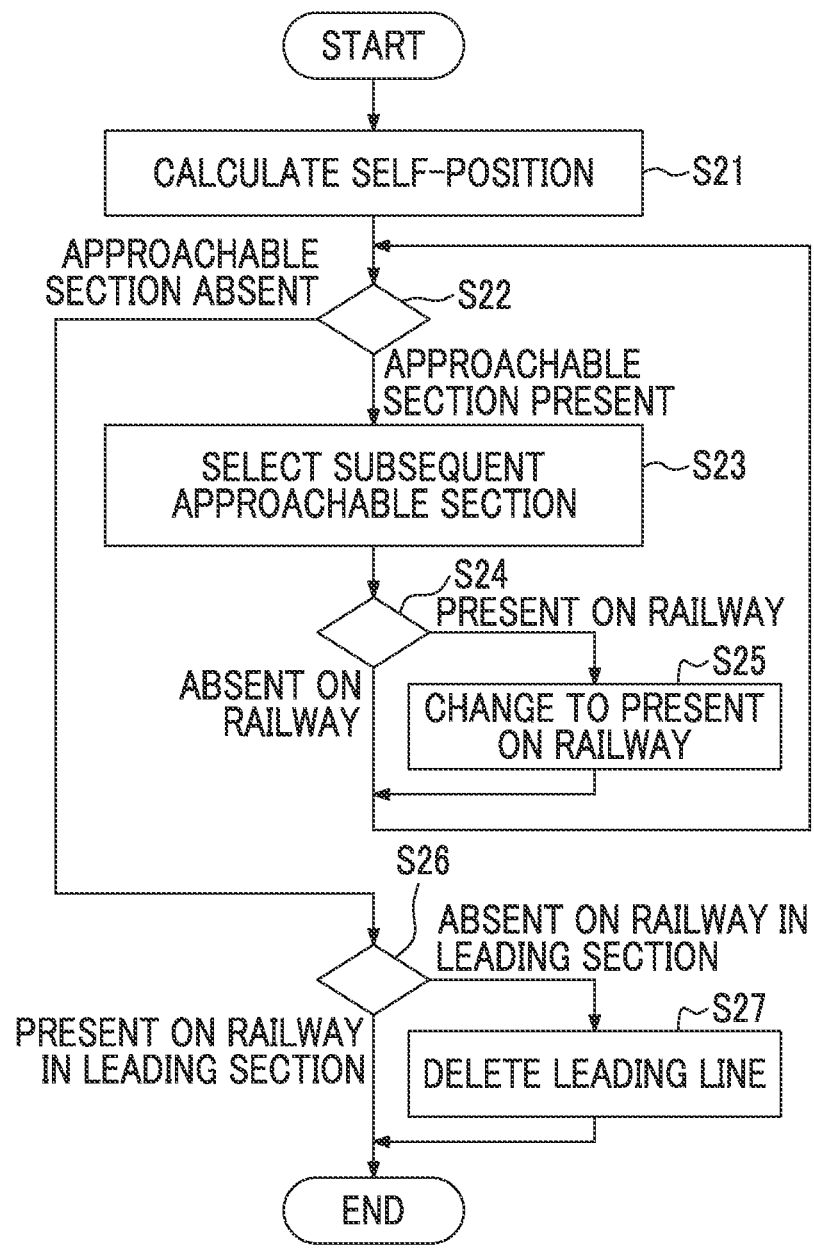
FIG. 6 is a flowchart illustrating an example of an automatic position update step (S2) illustrated in FIG. 5.
Figure 7:
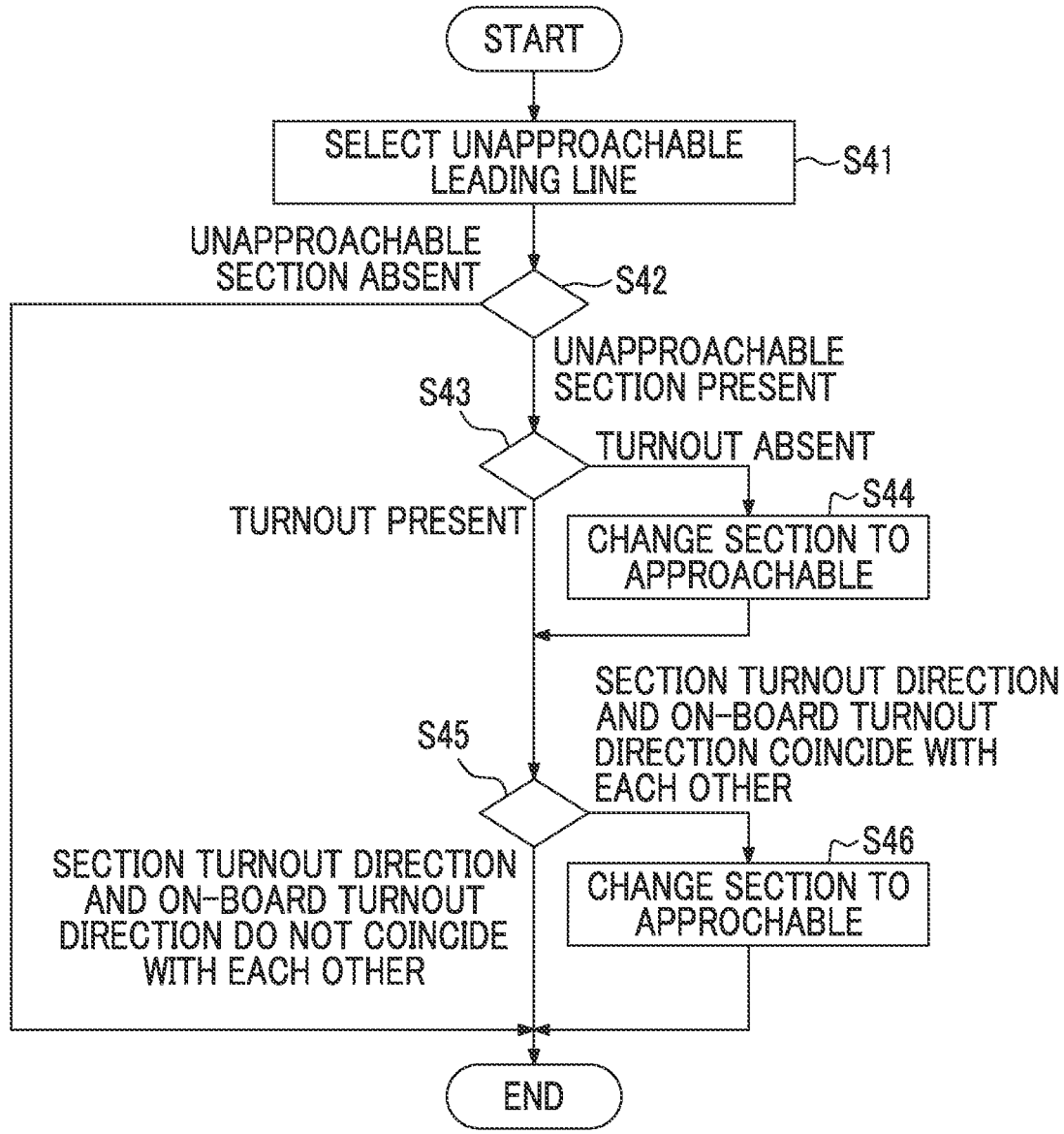
FIG. 7 is a flowchart illustrating an example of an approaching determination step (S4) illustrated in FIG. 5.
Figure 8:
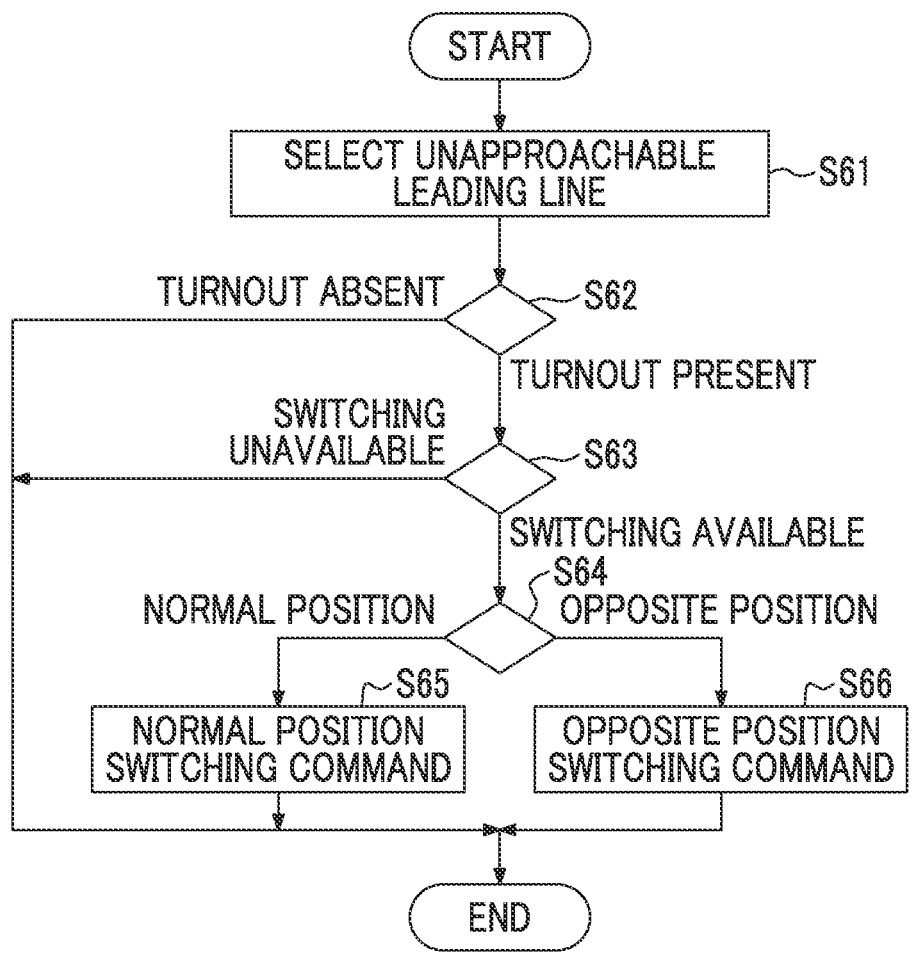
FIG. 8 is a flowchart illustrating an example of a switching command output step (S6) illustrated in FIG. 5.

Next, an operation example of the on-board device 11 illustrated in FIG. 1 will be described with reference to FIGS. 5 to 8. FIG. 5 is a flowchart illustrating an operation example of the on-board device 11 illustrated in FIG. 1. FIG. 6 is a flowchart illustrating an example of an automatic position update step (S2) illustrated in FIG. 5. FIG. 7 is a flowchart illustrating an example of an approaching determination step (S4) illustrated in FIG. 5. FIG. 8 is a flowchart illustrating an example of a switching command output step (S6) illustrated in FIG. 5.

The step illustrated in FIG. 5 is repeatedly performed at a predetermined cycle. When the step illustrated in FIG. 5 starts, the on-board device 11 first detects a turnout state of the on-board turnout device 12 (Step S1). In Step S1, the on-board device 11 detects whether an on-board turnout state is the normal position, the opposite position, or undetermined.

Next, the on-board device 11 updates a self-position inside the right section table 111 (Step S2). In Step S2, the on-board device 11 determines where the on-board device 11 itself is located in the right section table 11 described with reference to FIG. 4. In Step S2, the on-board device 11 specifies (a range of) the self-position by combining a position marker and a speed integral, as in a case of a general Communication Based Train Control (CBTC), for example. In the right section table 111, the on-board device 11 changes the section to "on the railway" in a case where the on-board device 11 approaches the section having no train 1 on the railway. In a case where the on-board device 11 itself leaves a leading section having the train 1 on the railway in a leading line, the on-board device 11 deletes a leading line.

As illustrated in FIG. 6, in Step S2 of FIG. 5, the on-board device 11 first calculates the self-position (Step S21). Next, the on-board device 11 selects a new approachable section until there is no unprocessed approachable section in the right section table 111 (until it is determined in Step S22 that there is no approachable section) (Step S23). The on-board device 11 determines whether or not the train 1 is present on the railway in each section (Step S24). In a case where the train 1 is present on the railway, the on-board device 11 repeatedly performs a step of changing the section as the on the railway (Step S25). When there is no longer unprocessed approachable section in the right section table 111 (when it is determined in Step S22 that there is no approachable section), the on-board device 11 determines whether or not the train 1 is present on the railway in the leading section of the right section table 111 (Step S26). In a case where the train 1 is absent on the railway in the leading section of the right section table 111 (case where the train 1 is absent on the railway in the leading section in Step S26), the on-board device 11 deletes the leading line of the right section table 111 (Step S27).

Next, in Step S3 of FIG. 5, the on-board device 11 updates the right section table 111 (Step S3). In Step S3, the on-board device 11 deletes the leading section through which the on-board device 11 itself completely passes, and thereafter, adds a new right section notified from the wayside device 2 to an end of the right section table 111. In the right section table 111, the on-board device 11 tentatively sets a state of the added section as "unapproachable". In addition, in a second embodiment to be described later, when there is a requested section, the on-board device 11 adds the requested section to the end, and sets the state as "requested".

Next, the on-board device 11 determines whether the section is approachable (Step S4). In Step S4, the on-board device 11 checks a section state in order from the leading section in the right section table 111, and finds the first line which is unapproachable. In a case where the turnout is not present in the unapproachable section in the right section table 111, the on-board device 11 sets the state as the approachable. On the other hand, in a case where the turnout is present in the unapproachable section, the on-board device 11 sets the state as the on-board turnout, and in a case where the on-board turnout direction and the turnout direction of the section coincide with each other, the on-board device 11 sets the state as the approachable.

As illustrated in FIG. 7, in Step S4 of FIG. 5, the on-board device 11 first finds the first line which is unapproachable in the right section table 111 (Step S41). In a case where there is the unapproachable section (case where "there is the unapproachable section" in Step S42), when there is no turnout (when "the turnout is absent" in Step S43), the on-board device 11 changes the section to the approachable in the right section table 111 (Step S44). In addition, in a case where there is the turnout (case where "the turnout is present" in Step S43), when the section turnout direction and the on-board turnout direction coincide with each other (when "the section turnout direction and the on-board turnout direction coincide with each other" in Step S45), the on-board device 11 changes the section to the approachable in the right section table 111 (Step S46).

Next, the on-board device 11 determines whether or not switching is available (Step S5). In Step S5, the on-board device 11 determines that the switching is available in a case where there is no turnout at all within an approachable range.

Next, the on-board device 11 outputs a switching command (Step S6). In Step S6, the on-board device 11 first finds the first line which is unapproachable or requested. Then, in a case where the turnout is present in the section and the switching is available, the on-board device 11 commands the on-board turnout device 12 to switch the direction to the turnout direction.

As illustrated in FIG. 8, in Step S6 of FIG. 5, the on-board device 11 first selects the first line which is unapproachable in the right section table 111 (Step S61). In a case where the first line which is unapproachable has the turnout (case where "the turnout is present" in Step S62), when it is determined that the switching is available in Step S5 (when the state is "switching available" in Step S63), and when the turnout is at the normal position (when the state is "the normal position" in Step S64), the on-board device 11 outputs a normal position switching command to the on-board turnout device 12 (Step S65). On the other hand, when the turnout is at the opposite position (when the state is "the opposite position" in Step S64), the on-board device 11 outputs an opposite position switching command to the on-board turnout device 12 (Step S66).

Next, referring to FIGS. 9A to 15B, an operation example of the train control system 10 illustrated in FIG. 1 in a case where the target train 1 travels from the section 2T to the section 7T on the track 300 illustrated in FIG. 22 will be described. FIGS. 9A, 10A, 11A, 12A, 13A, 14A, and 15A are schematic views illustrating a position of the train 1 on the track 300 illustrated in FIG. 22. However, in FIGS. 9A, 10A, 11A, 12A, 13A, 14A, and 15A, a vertical axis represents a speed, and a speed limit and an emergency brake speed pattern of the train 1 are illustrated together. FIGS. 9B, 10B, 11B, 12B, 13B, 14B, and 15B illustrate a state of the target section (section 7T (hereinafter, also referred to as the target section 7T)) illustrated in FIGS. 9A, 10A, 11A, 12A, 13A, 14A, and 15A in 1S and 2S of a state transition diagram illustrated in FIG. 2. FIGS. 9C, 11C, 12C, 13C, and 14C illustrate contents corresponding to FIGS. 9A, 10A, 11A, 12A, 13A, and 14A of the right section table 111 described with reference to FIG. 18.

FIGS. 9A to 9C illustrate a state where the target train 1 is present on the railway in the section 2T, another train 1a is present on the railway on the opposite position side 7Tr of the target section 7T, and the route request of the train 1 for the target section 7T is not made. That is, FIGS. 9A to 9C illustrate a state where the request for the approaching to the target section 7T is not made from the operation management device 3 which is a higher-level device. In this case, the section 2T to the section 6T which are shaded in FIG. 9A are in a state of the approachable illustrated in FIG. 9C. In addition, the target section 7T is in a state of the unapproachable (ST11 and ST21) as illustrated in FIG. 9B. As illustrated in FIG. 9A, the on-board device 11 sets the emergency brake speed pattern illustrated by a broken line so that the train 1 can stop inside the section 6T in a forward movement allowing state, and controls the speed of the train 1 to be equal to or lower than the emergency brake speed pattern. In an example illustrated in FIG. 9A, a speed limit is set in the section 2T and the section 3T, and the on-board device 11 sets the emergency brake speed pattern illustrated by a broken line to be equal to or lower than the speed limit.

Figure 10A:
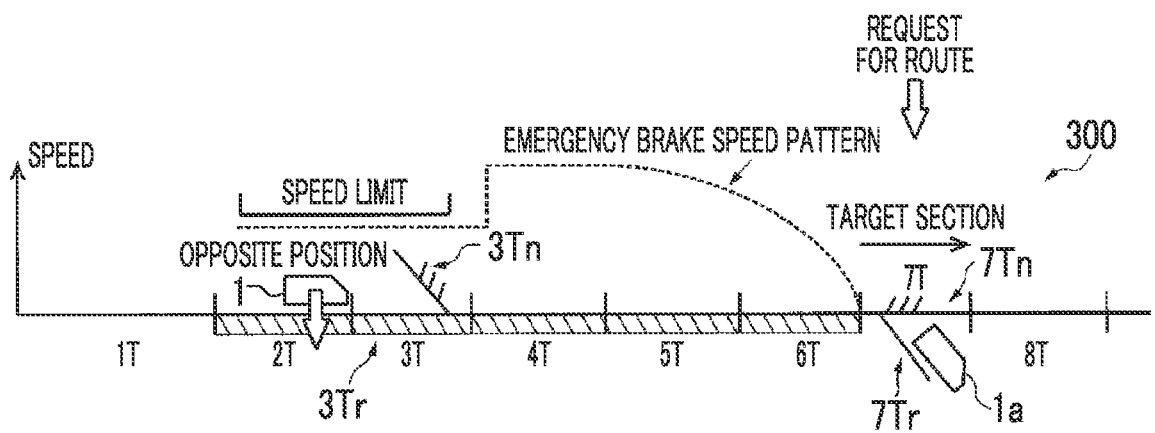
FIG. 10A is a schematic view for describing an operation example of the train control system 10 illustrated in FIG. 1.
Figure 10B:
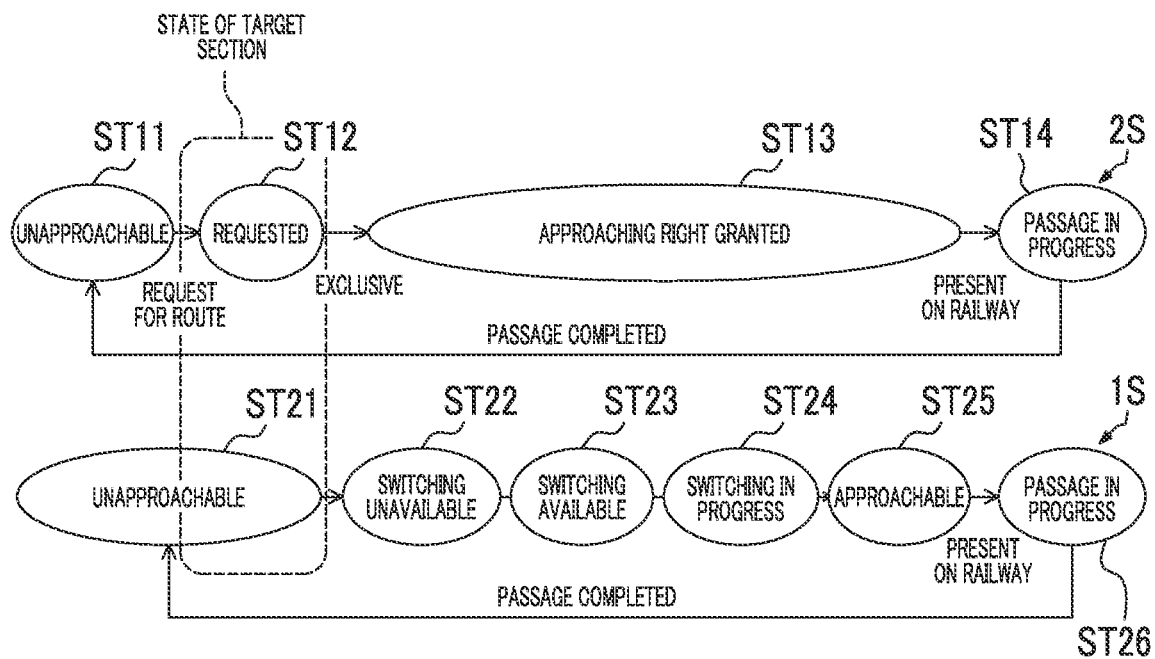
FIG. 10B is a schematic view for describing an operation example of the train control system 10 illustrated in FIG. 1.

FIGS. 10A and 10B illustrate a state where the target train 1 is present on the railway in the section 2T, another train 1a is present on the railway on the opposite position side 7Tr of the section 7T, and a route request of the train 1 for the target section 7T is made. That is, FIGS. 10A and 10B illustrate a state where the operation management device 3 which is a higher-level device requests for the approaching to the target section 7T. However, FIGS. 10A and 10B illustrate a state where the target section 7T is unapproachable since another train 1a is present. In addition, the target section 7T is in a state of the requested (ST12) and a state of the unapproachable (ST21) as illustrated in FIG. 10B.

FIGS. 11A to 11C illustrate a state where the target train 1 is present on the railway in the section 3T. FIGS. 11A to 11C illustrate a state where another train 1a passes through the opposite position side 7Tr of the target section 7T and the approaching right to the train 1 is granted. In FIG. 11A, the section 7T in a state of the approaching right granted is illustrated by leftward and downward shading. However, in this case, as illustrated in FIG. 11A, the train passes through another turnout (turnout section 3T). Accordingly, the on-board turnout cannot be switched. In this case, the target section 7T is in a state of the approaching right granted (ST13) and a state of the switching unavailable (ST22) as illustrated in FIG. 11B. In addition, as illustrated in FIG. 11C, in the right section table 111, the section 2T in the leading line is deleted (in FIG. 11C, the deleted line is illustrated by shading), and the section 7T is added to the end.

FIGS. 12A to 12C illustrate a state where the target train 1 is present on the railway in the section 4T. FIGS. 12A to 12C illustrate a state where the train 1 passes through the turnout section 3T and the on-board turnout can be switched. As illustrated in FIG. 12B, the target section 7T is in a state of the approaching right granted (ST13) and a state of the switching available (ST23). In addition, as illustrated in FIG. 12C, in the right section table 111, the section 3T in the leading line is deleted (in FIG. 12C, the deleted line is illustrated by shading).

FIGS. 13A to 13C illustrate a state where the target train 1 is present on the railway in the section 4T and the on-board turnout device 12 shows the switching in progress from the opposite position to the normal position. That is, FIGS. 13A to 13C illustrate a state where the train 1 shows on-board turnout switching in progress. As illustrated in FIG. 13B, the target section 7T is in a state of the approaching right granted (ST13) and a state of the switching in progress (ST24).

FIGS. 14A to 14C illustrate a state where the target train 1 is present on the railway in the section 5T and the on-board turnout device 12 is completely switched to the normal position. That is, FIGS. 14A to 14C illustrate a state where the on-board turnout switching is completed. In this manner, the target section 7T is approachable, and the emergency brake speed pattern is advanced so that the train 1 can be stopped in the section 7T. As illustrated in FIG. 14B, the target section 7T is in a state of the approaching right granted (ST13) and a state of the approachable (ST25). In addition, as illustrated in FIG. 14C, in the right section table 111, the section 4T in the leading line is deleted (in FIG. 14C, the deleted line is illustrated by shading).

Figure 15A:
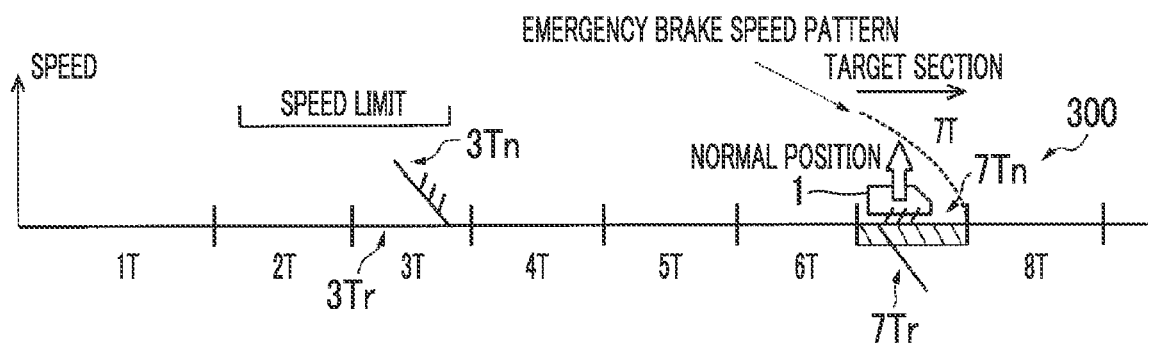
FIG. 15A is a schematic view for describing an operation example of the train control system 10 illustrated in FIG. 1.
Figure 15B:
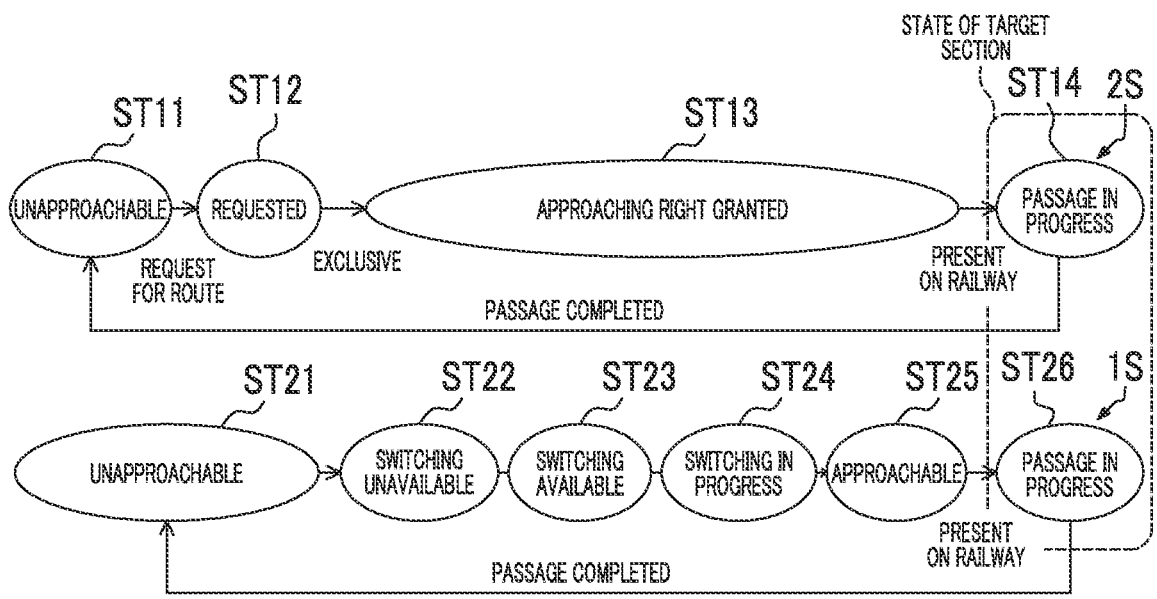
FIG. 15B is a schematic view for describing an operation example of the train control system 10 illustrated in FIG. 1.

FIGS. 15A and 15B illustrate a state where the target train 1 is present on the railway in the target section 7T. That is, FIGS. 15A and 15B illustrate a state where the train 1 shows passage in progress through the target section. The target section 7T is in a state of the passage in progress (ST14 and ST26) as illustrated in FIG. 15B.

As described above, in the train control system 10 of the first embodiment, the wayside device 2 performs exclusive control between trains, and does not determine final approaching in view of the turnout state. On the other hand, in the on-board device 11, the following steps (1) to (4) are performed. That is, the on-board device 11 performs each step of (1) determining whether or not the train passes through the turnout, (2) controlling the on-board turnout, (3) detecting whether switching of the on-board turnout is completed, and (4) determining the approaching.

Conditions for determining that a section A is "approachable" by the train 1 are as follows. The approaching right to the section A is granted. All of the sections from a currently traveling section to a section in front of the section A are "approachable". The turnout is absent in the section A, or the on-board turnout direction coincides with the direction of the section A, and the turnout is locked.

In addition, the condition for determining whether the turnout switching is available (unlocking condition) is that no turnout is present in an approachable range from the currently traveling section.

According to the first embodiment, for example, in a combination of the on-board turnout and the CBTC, the following can be guaranteed, and safety at the time of passing through the turnout can be secured. 1) No approaching to the turnout where the switching is not completed. 2) No exceeding a turnout passage speed limit. 3) No switching while passing through the turnout. 4) No approaching of other trains until the train completely passes through the turnout.

As described above, according to the first embodiment, the wayside device 2 manages whether each train 1 has the approaching right to each section, and the on-board device 11 determines for itself whether the section including the turnout having the approaching right is approachable. Therefore, the safety can be further improved in the train control system 10 using the on-board turnout device 12.

Second Embodiment

Next, a second embodiment of the present disclosure will be described with reference to FIGS. 16 to 21D. In the second embodiment, a train interval is shortened as follows, compared to the first embodiment. A basic configuration of the train control system 10 illustrated in FIG. 1 according to the first embodiment is common to that according to the second embodiment. In the second embodiment, in addition to the configuration of the first embodiment, the section of the "requested" is also transmitted from the wayside device 2 to the on-board device 11. In addition, the on-board device 11 switches the on-board turnout for the section of the "requested" when the turnout is not locked.

Figures 16, 17:
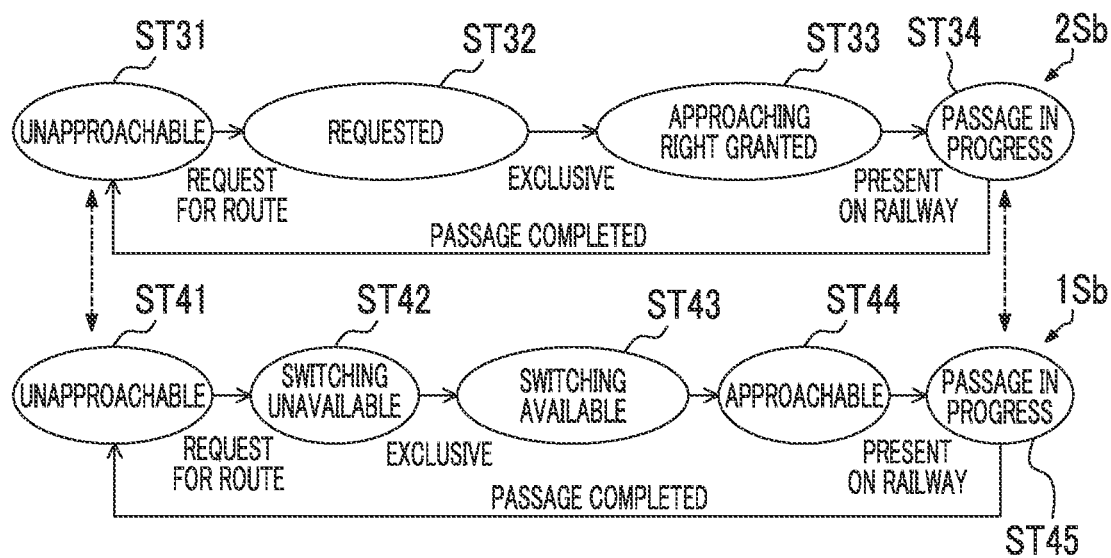
FIG. 16 is in a state transition diagram illustrating an operation example of the wayside device 2 and the on-board device 11 which are illustrated in FIG. 1 according to another embodiment of the present disclosure.
FIG. 17 is a view for describing an example of communication between the wayside device 2 and the on-board device 11 which are illustrated in FIG. 1 according to another embodiment of the present disclosure.

FIG. 16 illustrates a state transition diagram 2Sb of the wayside device 2 and a state transition diagram 1Sb of the on-board device 11 illustrated in FIG. 1 in the second embodiment. The wayside device 2 manages each section for each train 1 in a state of the unapproachable (ST31), the requested (ST32), the approaching right granted (ST33), or the passage in progress (ST34). Contents and transition conditions of the respective states of the unapproachable (ST31), the requested (ST32), the approaching right granted (ST33), and the passage in progress (ST34) which are illustrated in FIG. 16 are the same as the respective states of the unapproachable (ST11), the requested (ST12), the approaching right granted (ST13), and the passage in progress (ST14).

On the other hand, the on-board device 11 manages each section for the train 1 in any state of the unapproachable (ST41), the switching unavailable (ST42), the switching available (ST43), the approachable (ST44), and the passage in progress (ST45). The unapproachable (ST41) is in a state where the section is not approachable by the train 1. In a case where the wayside device 2 receives the route request of the train 1 for the section (ST32), the on-board device 11 makes state transition from the unapproachable (ST41) to the switching unavailable (ST42). The switching unavailable (ST42) is in a state where the on-board turnout device 12 of the train 1 cannot change the turnout direction. In a case where an exclusive condition (condition for the switching available (ST23)) is satisfied, the on-board device 11 makes state transition from the switching unavailable (ST42) to the switching available (ST43). The switching available (ST43) is in a state where the on-board turnout device 12 of the train 1 can change the turnout direction. The on-board turnout device 12 immediately starts to change the turnout direction when the on-board turnout device 12 is locked. In a case where the on-board turnout device 12 completely changes the turnout direction, the on-board device 11 makes state transition from the switching available (ST43) to the approachable (ST44). The approachable (ST43) is in a state where the section is approachable by the train 1. In a case where the train 1 is present on the railway in the section, the on-board device 11 makes state transition from the approachable (ST43) to the passage in progress (ST45). The passage in progress (ST45) is in a state where the train 1 currently travels in the section. In a case where the train 1 completely passes through the section, the on-board device 11 makes state transition from the passage in progress (ST45) to the unapproachable (ST41).

FIG. 17 is a view for describing an example of a communication direction of information and content of the information between the wayside device 2 and the on-board device 11 which are illustrated in FIG. 1 according to the second embodiment. As illustrated in FIG. 17, the wayside device 2 transmits information indicating the permutation of the sections having the approaching right and information indicating a requested state of the subsequent section to the on-board device 11, and the on-board device 11 transmits information indicating a current position of the train 1 to the wayside device 2.

FIG. 18 is a schematic view illustrating a configuration example of a right section table 111b managed by the on-board device 11 illustrated in FIG. 1 according to the second embodiment. The right section table 111b illustrated in FIG. 18 is a file that stores all of the sections determined by the wayside device 2 that the train 1 has the approaching right to the sections, in the order corresponding to the traveling direction of the train 1, in association with section names, contents of the turnout, whether or not the train 1 is present on the railway, whether the sections are approachable by the train 1, and whether the section is requested.

In the right section table 111b illustrated in FIG. 18, as in the right section table 111 of the first embodiment illustrated in FIG. 4, the upper section is the front side in the traveling direction, and the lower section is the opposite side in the traveling direction. The right section table 111b illustrated in FIG. 18 includes each information in a case where the train 1 is present on the railway in the section 2T on the track 300 illustrated in FIG. 22, and each section up to the section 7T is in a state of the approaching right granted. For example, the section 2T is in a state where the turnout is absent, the train 1 is present on the railway "○", and the approachable (ST44). For example, in the section 7T, the turnout is in a state where the turnout is "the normal position", the train 1 is absent on the railway "-", and the section is requested (ST32).

Figure 19A:
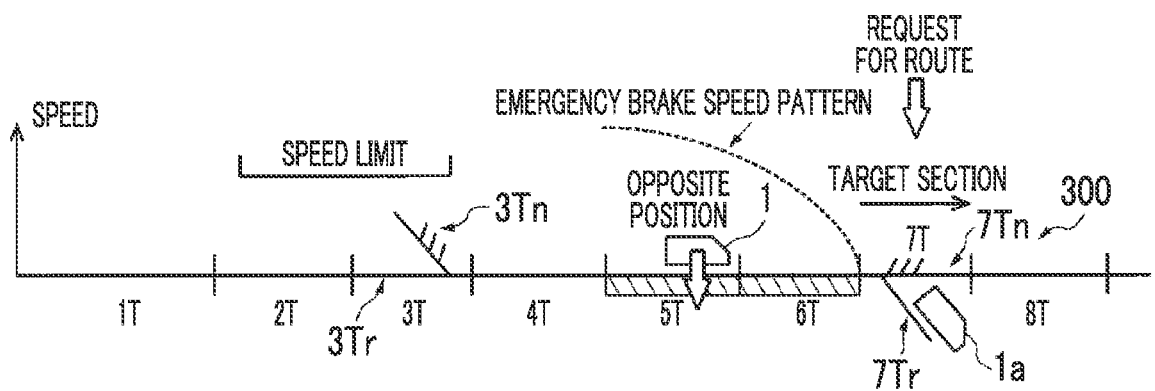
FIG. 19A is a schematic view for describing an operation example of the train control system 10 illustrated in FIG. 1 according to another embodiment of the present disclosure.
Figure 19B:
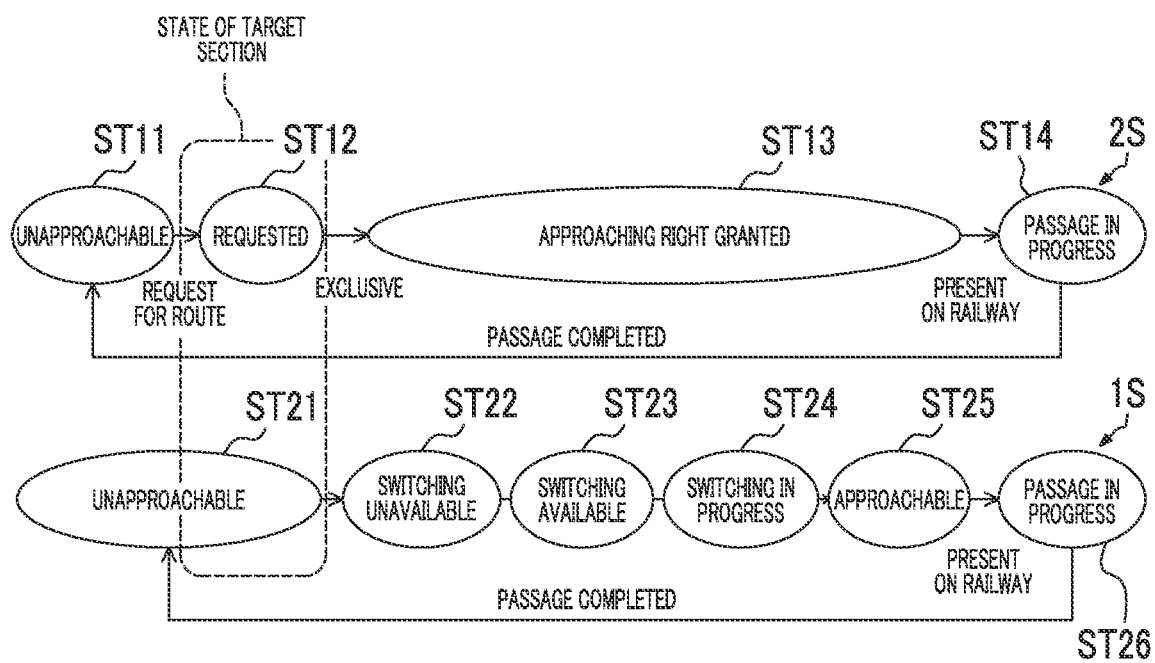
FIG. 19B is a schematic view for describing an operation example of the train control system 10 illustrated in FIG. 1 according to another embodiment of the present disclosure.
Figure 19C:
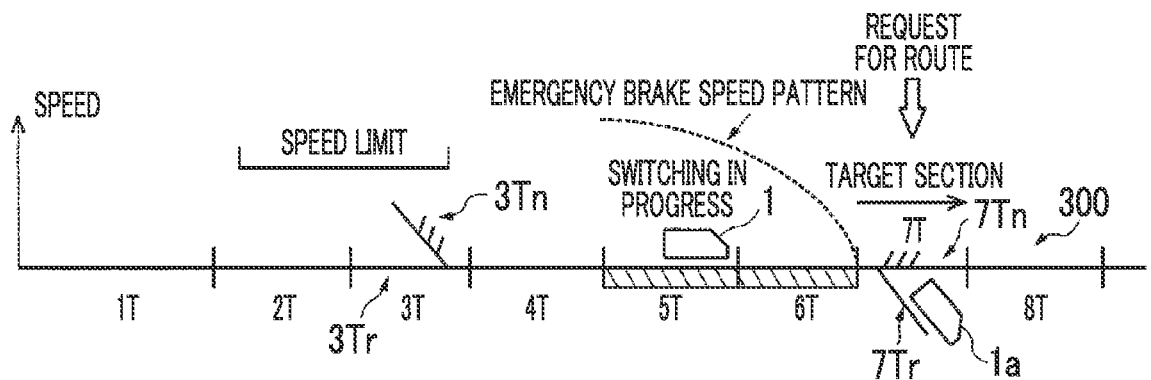
FIG. 19C is a schematic view for describing an operation example of the train control system 10 illustrated in FIG. 1 according to another embodiment of the present disclosure.
Figure 19D:
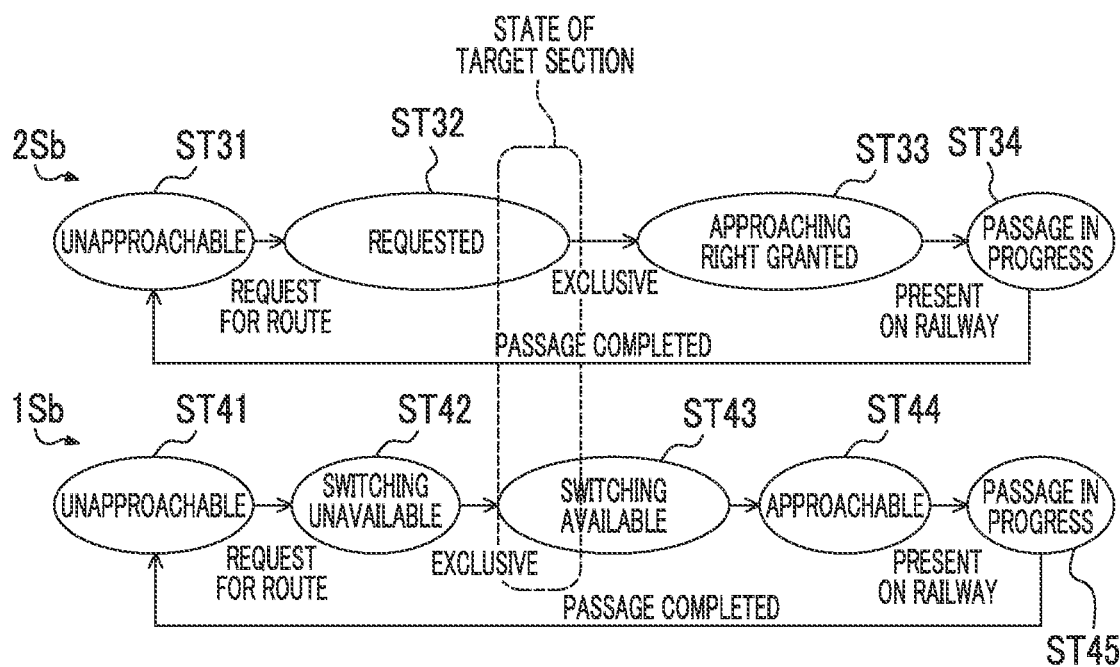
FIG. 19D is a schematic view for describing an operation example of the train control system 10 illustrated in FIG. 1 according to another embodiment of the present disclosure.
Figure 20A:
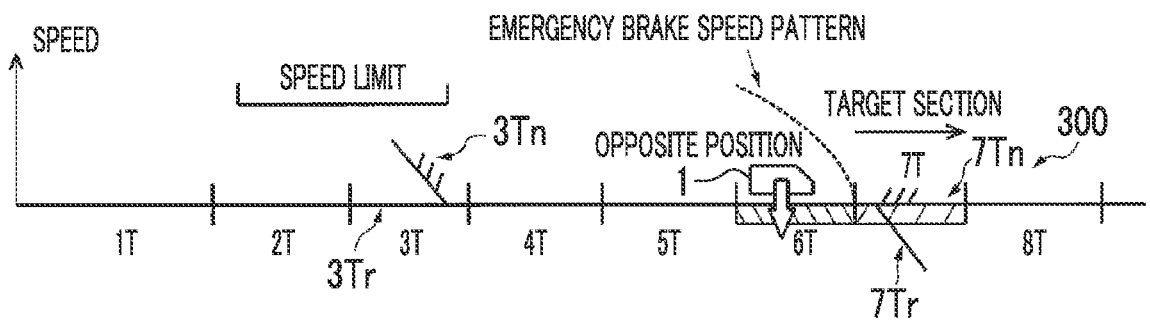
FIG. 20A is a schematic view for describing an operation example of the train control system 10 illustrated in FIG. 1 according to another embodiment of the present disclosure.
Figure 20B:
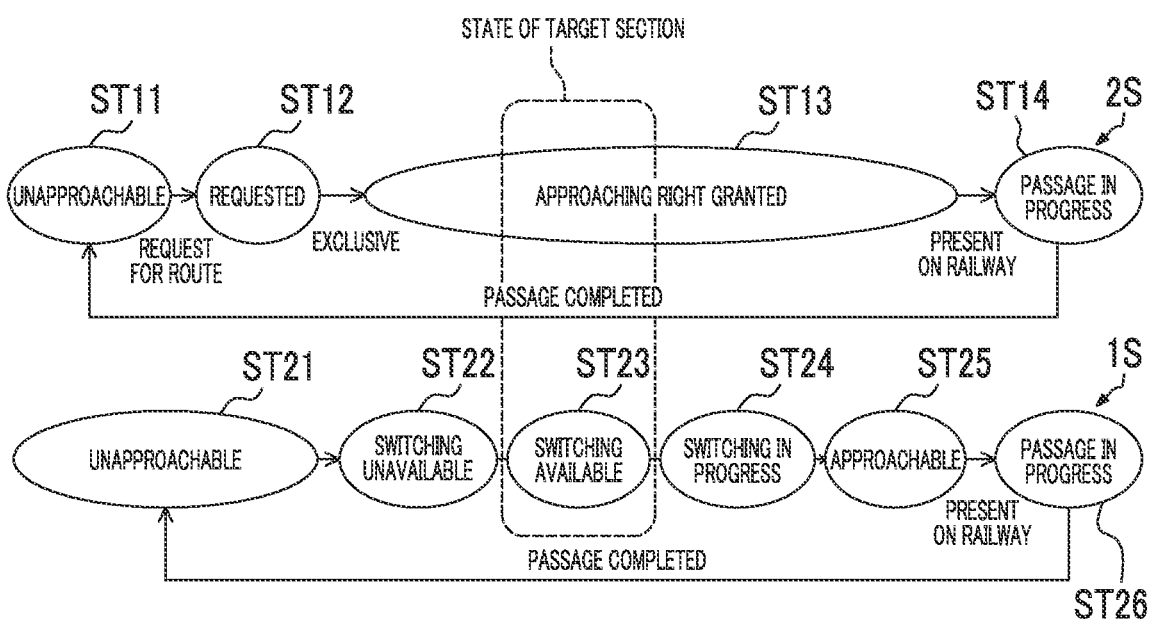
FIG. 20B is a schematic view for describing an operation example of the train control system 10 illustrated in FIG. 1 according to another embodiment of the present disclosure.
Figure 20C:
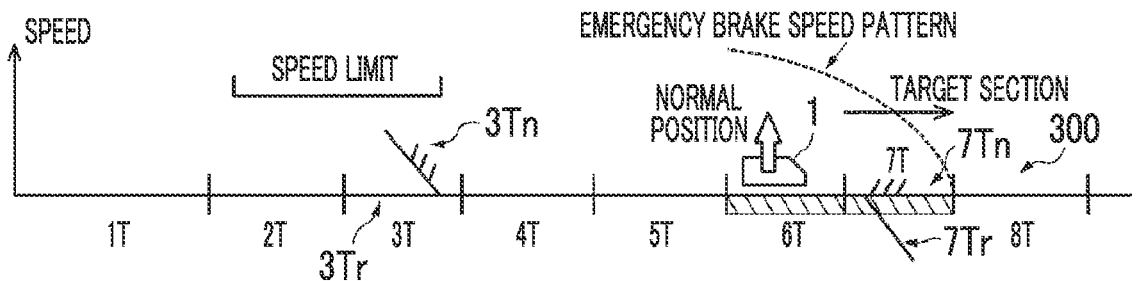
FIG. 20C is a schematic view for describing an operation example of the train control system 10 illustrated in FIG. 1 according to another embodiment of the present disclosure.
Figure 20D:
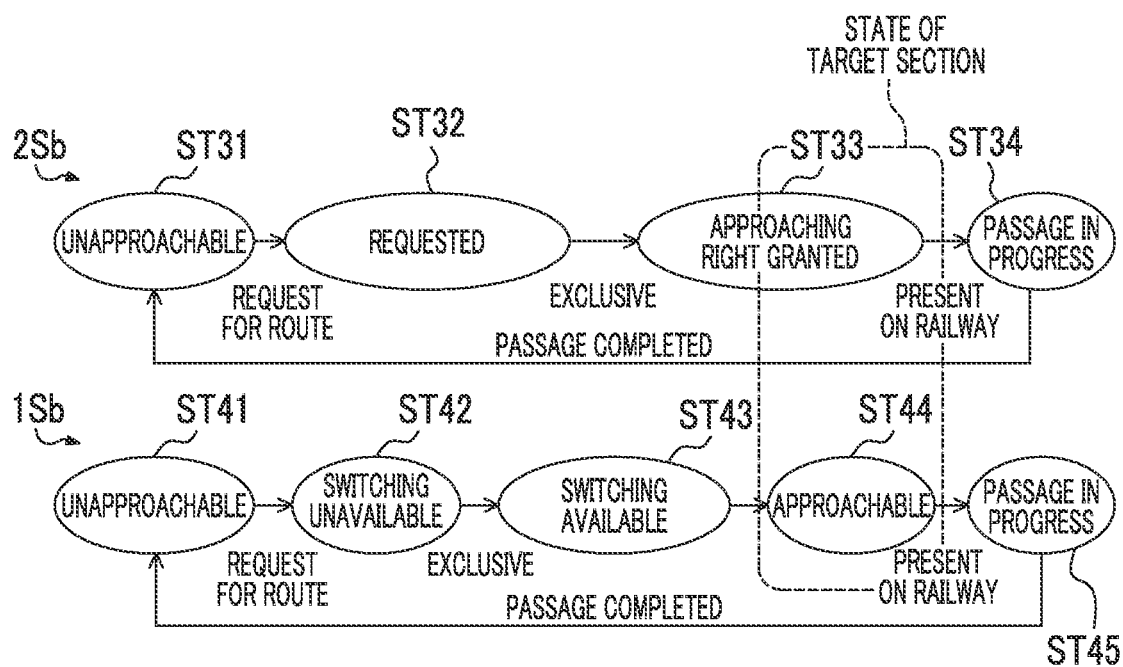
FIG. 20D is a schematic view for describing an operation example of the train control system 10 illustrated in FIG. 1 according to another embodiment of the present disclosure.
Figure 21A:
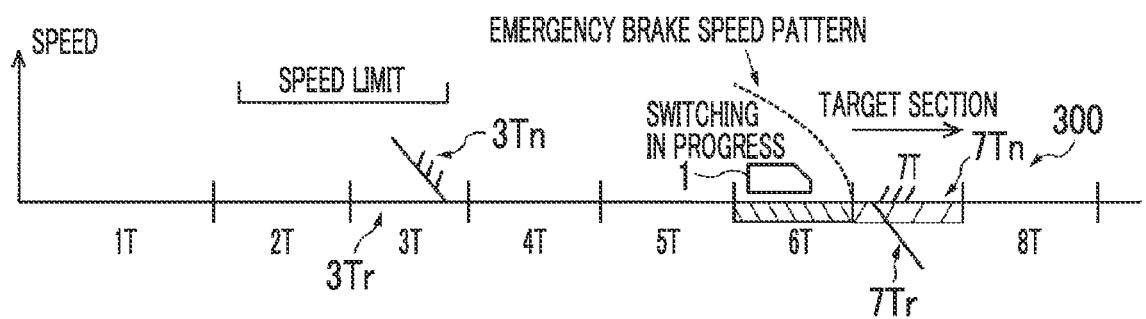
FIG. 21A is a schematic view for describing an operation example of the train control system 10 illustrated in FIG. 1 according to another embodiment of the present disclosure.
Figure 21B:
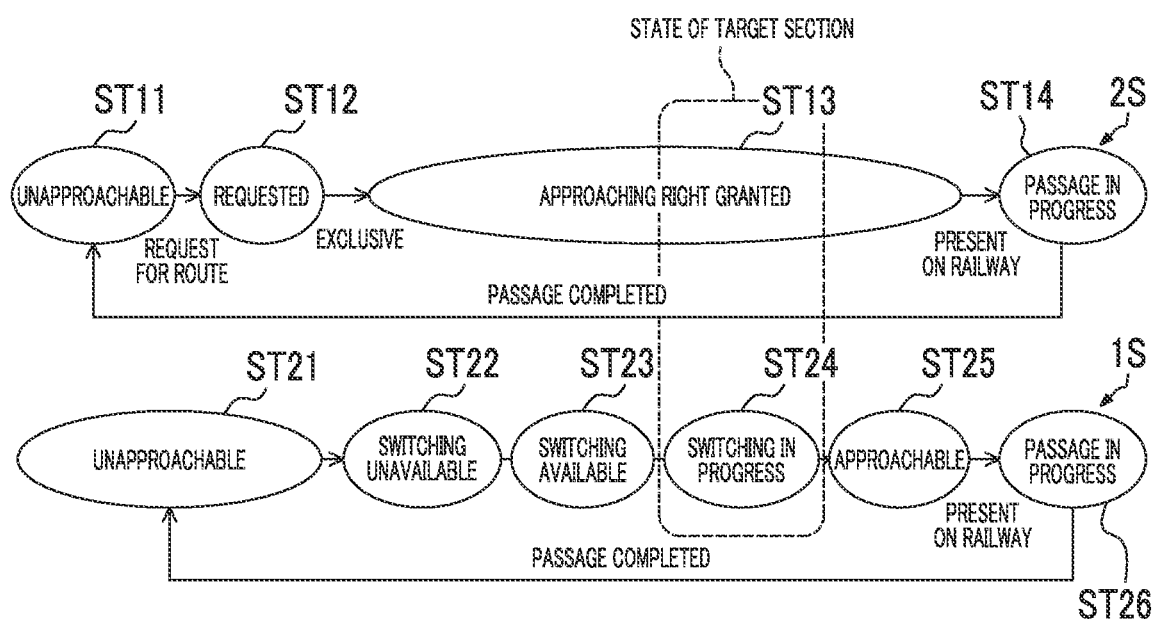
FIG. 21B is a schematic view for describing an operation example of the train control system 10 illustrated in FIG. 1 according to another embodiment of the present disclosure.
Figure 21C:
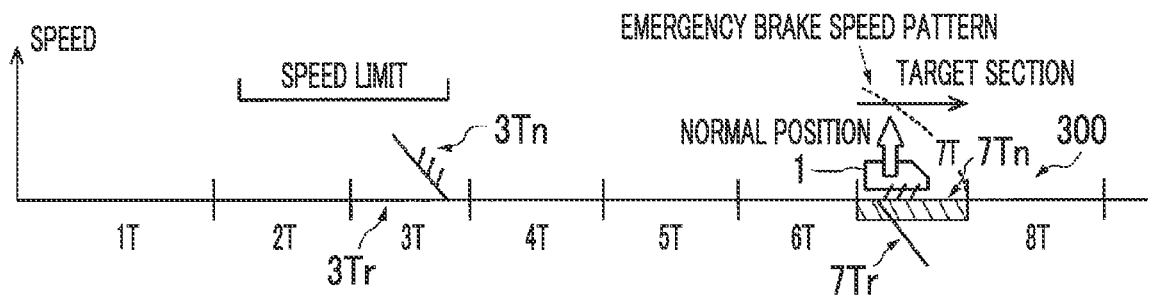
FIG. 21C is a schematic view for describing an operation example of the train control system 10 illustrated in FIG. 1 according to another embodiment of the present disclosure.
Figure 21D:
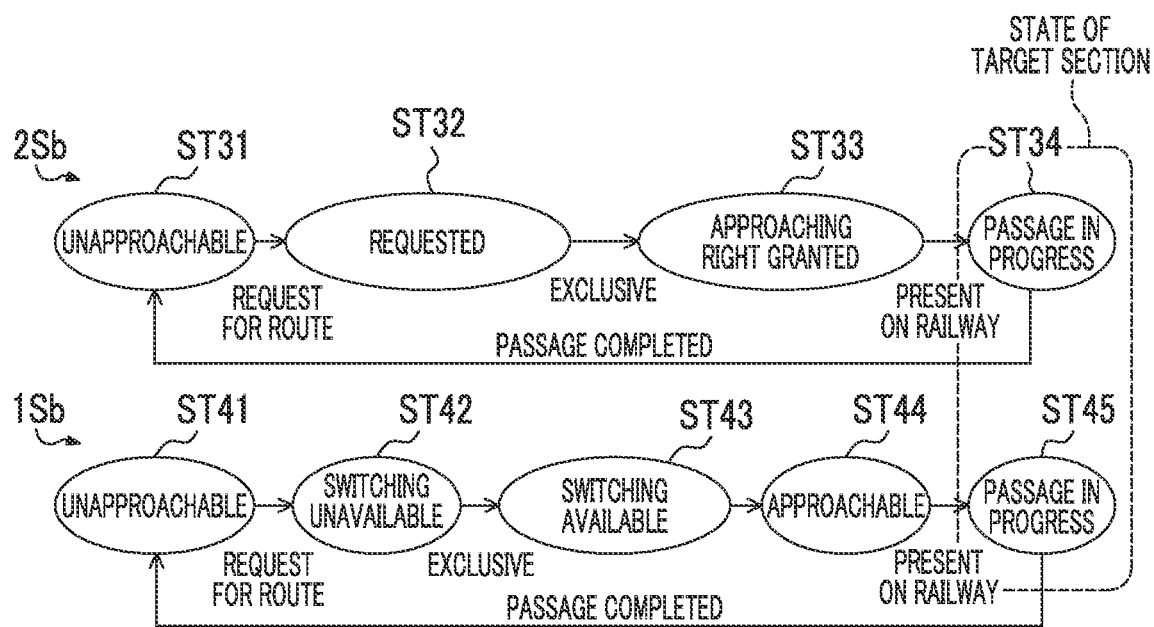
FIG. 21D is a schematic view for describing an operation example of the train control system 10 illustrated in FIG. 1 according to another embodiment of the present disclosure.

Next, an operation example of the train control system 10 illustrated in FIG. 1 in a case where the target train 1 travels from the section 5T to the section 7T on the track 300 illustrated in FIG. 22 will be described with reference to FIGS. 19A to 21D. FIGS. 19A, 19B, 20A, 20B, 21A, and 21B illustrate an example of a case of the first embodiment, and FIGS. 19C, 19D, 20C, 20D, 21C, and 21D illustrate an example of a case of the second embodiment. FIGS. 19A, 20A, and 21A are schematic views illustrating a position of the train 1 on the track 300 illustrated in FIG. 22. However, in FIGS. 19A, 20A, and 21A, the vertical axis represents the speed, and the speed limit and the emergency brake speed pattern of the train 1 are illustrated together. FIGS. 19B, 20B, and 21B illustrate a state of the target section (section 7T) illustrated in FIGS. 19A, 20A, and 21A in state transition diagrams 1S and 2S illustrated in FIG. 2. FIGS. 19C, 20C, and 21C are schematic views illustrating a position of the train 1 on the track 300 illustrated in FIG. 22. In addition, FIGS. 19D, 20D, and 21D illustrate a state of the target section (section 7T) illustrated in FIGS. 19C, 20C, and 21C in state transition diagrams 1Sb and 2Sb illustrated in FIG. 16.

In the first embodiment, FIG. 19A illustrates a state where the target train 1 is present on the railway in the section 5T, another train 1a is present on the railway on the opposite position side 7Tr of the target section 7T, and the route request of the train 1 for the target section 7T is made. In this case, the sections 5T to 6T illustrated by shading in FIG. 19A are in a state of the approachable. In addition, the target section 7T is in a state of the requested (ST12) and a state of the unapproachable (ST21) as illustrated in FIG. 19B. In addition, the on-board turnout device 12 of the train 1 is in a state of the opposite position. As illustrated in FIG. 19A, the on-board device 11 sets the emergency brake speed pattern illustrated by the broken line so that the train 1 can stop inside the section 6T in a forward movement allowing state, and controls the speed of the train 1 to be equal to or lower than the emergency brake speed pattern. In a case of the first embodiment illustrated in FIGS. 19A and 19B, the front section is requested, but the request is not transmitted to the train 1.

On the other hand, in the second embodiment, FIG. 19C illustrates a state where the target train 1 is present on the railway in the section 5T, another train 1a is present on the railway on the opposite position side 7Tr in the target section 7T, and the route request of the train 1 for the target section 7T is made. In this case, the section 5T to the section 6T illustrated by shading in FIG. 19C are in a state of the approachable. In addition, the target section 7T is in a state of the requested (ST32) and a state of the switching available (ST43) as illustrated in FIG. 19D. In addition, the on-board turnout device 12 of the train 1 is not locked, and proceeds to a state of the switching in progress. As illustrated in FIG. 19C, the on-board device 11 sets the emergency brake speed pattern illustrated by a broken line so that the train 1 can stop inside the section 6T in a forward movement allowing state, and controls the speed of the train 1 to be equal to or lower than the emergency brake speed pattern. In a case of the second embodiment illustrated in FIGS. 19C and 19D, when the front section is requested, the switching starts if the on-board turnout is not locked.

In the first embodiment, FIG. 20A illustrates a state where the target train 1 is present on the railway in the section 6T, and it is determined that the train 1 has the approaching right to the target section 7T. In this case, the section 6T illustrated by rightward and downward shading in FIG. 20A is in a state of the approachable, and the section 7T illustrated by leftward and downward shading is in a state of the approaching right granted. In addition, as illustrated in FIG. 20B, the target section 7T is in a state of the approaching right granted (ST13) and a state of the switching available (ST23). In addition, the on-board turnout device 12 of the train 1 is in a state of the opposite position. As illustrated in FIG. 20A, the on-board device 11 sets the emergency brake speed pattern illustrated by the broken line so that the train 1 can stop inside the section 6T in a forward movement allowing state, and controls the speed of the train 1 to be equal to or lower than the emergency brake speed pattern. In a case of the first embodiment illustrated in FIGS. 20A and 20B, the section 6T is in a state of "the switching available" after the approaching right to the front section is granted.

On the other hand, in the second embodiment, FIG. 20C illustrates a state where the target train 1 is present on the railway in the section 6T. In this case, the section 6T to the section 7T illustrated by shading in FIG. 20C are in a state of the approachable. In addition, as illustrated in FIG. 20D, the target section 7T is in a state of the approaching right granted (ST33) and a state of the approachable (ST44). In addition, the on-board turnout device 12 of the train 1 is in a state of the normal position. As illustrated in FIG. 20C, the on-board device 11 sets the emergency brake speed pattern illustrated by the broken line so that the train 1 can stop inside the section 7T in a forward movement allowing state, and controls the speed of the train 1 to be equal to or lower than the emergency brake speed pattern. In a case of the second embodiment illustrated in FIGS. 20C and 20D, the switching is already completed when the approaching right to the front section is granted, and the section is immediately in a state of "the approachable".

In the first embodiment, FIG. 21A illustrates a state where the target train 1 is present on the railway in the section 6T, and it is determined that the train 1 has the approaching right to the target section 7T. In this case, the section 6T illustrated by rightward and downward shading in FIG. 21A is in a state of the approachable, and the section 7T illustrated by the leftward and downward shading in FIG. 21A is in a state of the approaching right granted. In addition, as illustrated in FIG. 21B, the target section 7T is in a state of the approaching right granted (ST13) and a state of the switching in progress (ST24). In addition, the on-board turnout device 12 of the train 1 is in a state of the switching in progress. As illustrated in FIG. 21A, the on-board device 11 sets the emergency brake speed pattern illustrated by the broken line so that the train 1 can stop inside the section 6T in a forward movement allowing state, and controls the speed of the train 1 to be equal to or lower than the emergency brake speed pattern. In a case of the first embodiment illustrated in FIGS. 21A and 21B, the target section is not approachable until the switching is completed. In addition, train operation density is sacrificed during a switching time.

On the other hand, in the second embodiment, FIG. 21C illustrates a state where the target train 1 is present on the railway in the section 7T. In this case, the section 7T illustrated by shading in FIG. 21C is in a state of the approachable. In addition, as illustrated in FIG. 21D, the target section 7T is in a state of the passage in progress (ST34 and ST45). In addition, the on-board turnout device 12 of the train 1 is in a state of the normal position. As illustrated in FIG. 21C, the on-board device 11 sets the emergency brake speed pattern illustrated by the broken line so that the train 1 can stop inside the section 7T in a forward movement allowing state, and controls the speed of the train 1 to be equal to or lower than the emergency brake speed pattern. In a case of the second embodiment illustrated in FIGS. 21C and D, the train approaches the target section earlier than in a case of the first embodiment.

As described above, according to the second embodiment, operation density can be improved while safety can be maintained in the train control system 10 using the on-board turnout device.

In the first embodiment and the second embodiment, an example has been described in which the on-ground operation management system (operation management device 3) requests the signal system (on-ground device 2) for the route. However, as disclosed in Japanese Unexamined Patent Application Publication No 2017-94975, the present disclosure may be combined with a system in which the on-board device autonomously requests for the route.

As described above, according to the respective embodiments of the present disclosure, in a railway system that performs high-density operation, it is possible to reduce costs by reducing on-ground facilities without impairing operation density and safety.

Hitherto, the embodiments of the present disclosure have been described with reference to the drawings. However, specific configurations are not limited to the above-described embodiments, and design changes within the scope not departing from the concept of the present disclosure are also included.

<Computer Configuration>

Figure 24:
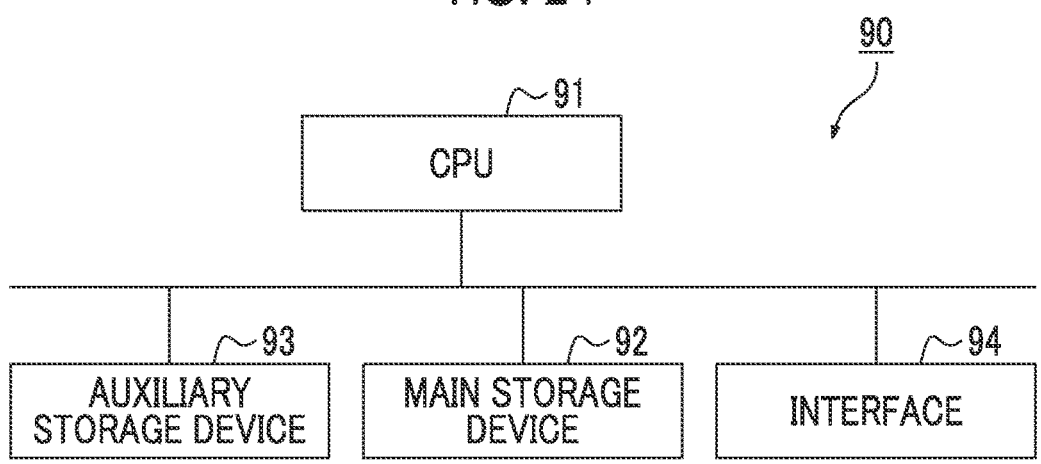
FIG. 24 is a schematic block diagram illustrating a configuration of a computer according to at least one embodiment.

FIG. 24 is a schematic block diagram illustrating a configuration of a computer according to at least one embodiment.

A computer 90 includes a processor 91, a main memory 92, a storage 93, and an interface 94.

The operation management device 3, the wayside device 2, and the on-board device 11 which are described above are installed in the computer 90. An operation of each processing unit described above is stored in the storage 93 in a form of a program. The processor 91 reads the program from the storage 93, develops the program in the main memory 92, and performs the above-described steps in accordance with the program. In addition, the processor 91 secures a storage region corresponding to each storage unit described above in the main memory 92 in accordance with the program.

The program may partially realize functions fulfilled by the computer 90. For example, the program may cause the functions to be fulfilled in combination with another program already stored in the storage or in combination with another program installed another device. In another embodiment, in addition to the above-described configuration or in place of the above-described configuration, the computer may include a custom large scale integrated circuit (LSI) such as a programmable logic device (PLD). Examples of the PLD include a programmable array logic (PAL), a generic array logic (GAL), a complex programmable logic device (CPLD), and a field programmable gate array (FPGA). In this case, functions realized by the processor may be partially or entirely realized by the integrated circuit.

Examples of the storage 93 include a hard disk drive (HDD), a solid state drive (SSD), a magnetic disk, an optical magnetic disk, a compact disc read only memory (CD-ROM), and a digital versatile disc read only memory (DVD-ROM), and a semiconductor memory. The storage 93 may be internal media directly connected to a bus of the computer 90, or external media connected to the computer 90 via the interface 94 or a communication line. In addition, in a case where this program is distributed to the computer 90 via the communication line, the computer 90 receiving the distribution may develop the program in the main memory 92, and may perform the above-described steps. In at least one embodiment, the storage 93 is a non-temporary tangible storage medium.

INDUSTRIAL APPLICABILITY

According to each aspect of the above-described disclosure, a feedforward steering angle can be calculated with higher accuracy in view of dynamics.

The invention claimed is:

1. A train control system comprising:
a wayside device performing exclusive control between trains in each of a plurality of sections that divide a track, and managing whether or not each of the trains has an approaching right to each of the sections; and
an on-board device mounted on the train including an on-board turnout device, and determining for itself that a turnout section is approachable, in a case where the section determined by the wayside device to which the train has the approaching right is the turnout section which is the section including a turnout, when a turnout direction of the train in the turnout section and a turnout direction of the on-board turnout device coincide with each other.

2. The train control system according to claim 1, wherein the wayside device determines whether or not the train has the approaching right to the section when a request for the approaching right of the train to the section is received from a higher-level device, and
in a case where the wayside device receives the request with respect to a train, when the section relating to the request is the turnout section and the on-board turnout device is not locked, the on-board device causes a turnout direction of the train and a turnout direction of the on-board turnout device in the turnout section to coincide with each other.

3. The train control system according to claim 2, wherein the wayside device sequentially notifies the on-board device of at least a permutation of the sections to which the approaching right is granted, and
the on-board device sequentially notifies the wayside device of at least a current position.

4. The train control system according to claim 1, wherein the wayside device sequentially notifies the on-board device of at least a permutation of the sections to which the approaching right is granted, and
the on-board device sequentially notifies the wayside device of at least a current position.

5. An on-board device mounted on trains including an on-board turnout device,
wherein for a section to which the train has an approaching right, the on-board device determines for itself that a turnout section is approachable, in a case where:
a turnout is present in the section, and
a turnout direction of the train in the turnout section and a turnout direction of the on-board turnout device coincide with each other.

6. A train control method for a train control system including an on-board device mounted on a train including an on-board turnout device, the train control method comprising:
causing the on-board device to determine for itself that a turnout section is approachable, in a case where a turnout is present in the section to which the train has an approaching right, and a turnout direction of the train in the turnout section and a turnout direction of the on-board turnout device coincide with each other.

* * * * *